United States Patent [19]

Boudreau et al.

[11] Patent Number: 4,563,736
[45] Date of Patent: Jan. 7, 1986

[54] MEMORY ARCHITECTURE FOR FACILITATING OPTIMUM REPLACEABLE UNIT (ORU) DETECTION AND DIAGNOSIS

[75] Inventors: Daniel A. Boudreau; Edward R. Salas; Richard C. Zelley, all of Billerica, Mass.

[73] Assignee: Honeywell Information Systems Inc., Waltham, Mass.

[21] Appl. No.: 509,265

[22] Filed: Jun. 29, 1983

[51] Int. Cl.⁴ .............................................. G06F 13/00
[52] U.S. Cl. ........................................ 364/200; 371/16
[58] Field of Search ... 364/200 MS File, 900 MS File; 371/16

[56] References Cited

U.S. PATENT DOCUMENTS 4,371,952 2/1983 Schuck ............................... 364/900

Primary Examiner—Raulfe B. Zache
Attorney, Agent, or Firm—Faith F. Driscoll; John S. Solakian

[57] ABSTRACT

A single computer board data processing system includes a multiport memory system which is accessible by I/O controllers through a system bus I/O memory port or directly by the system's central processing unit (CPU) via a CPU memory port. The logic and control circuits of the memory ports and CPU are included within the computer main board while memory modules/pacs are contained on one or more memory daughter boards which plug into memory input/output connectors contained on the main board. The port address and data paths connect in common to the memory connectors for transmitting and receiving memory addresses and data between the memory modules and the CPU and I/O ports. At least one register connects between the CPU and to common address path. When the CPU is placed in a diagnostic mode of operation, this register together with existing data registers are conditioned to store signals representative of the address and data being transmitted to the memory modules enabling the CPU to diagnose whether the main board or portions thereof has failed without requiring any testing of the memory modules.

43 Claims, 7 Drawing Figures

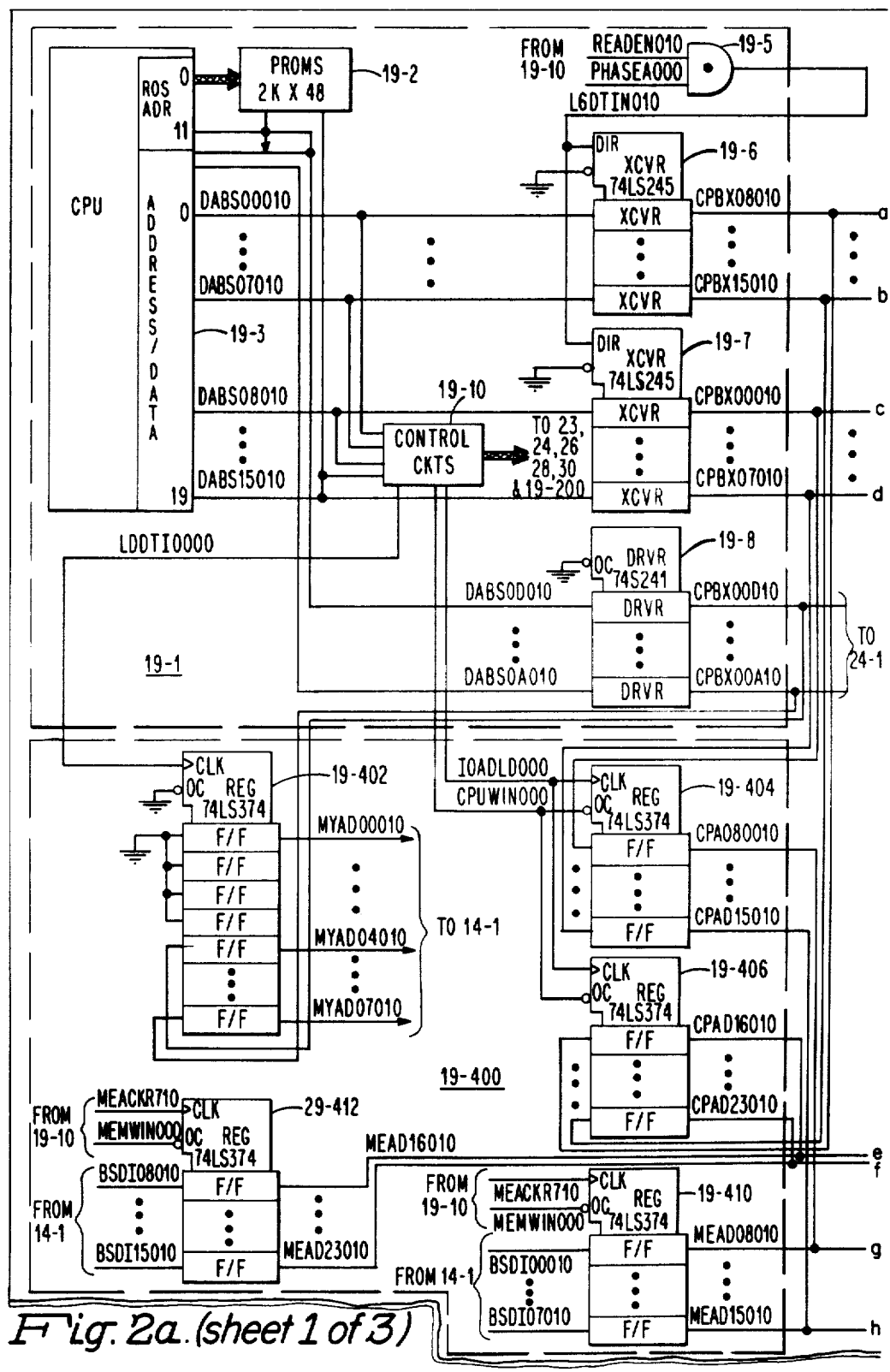
Fig. 2a. (sheet 1 of 3)

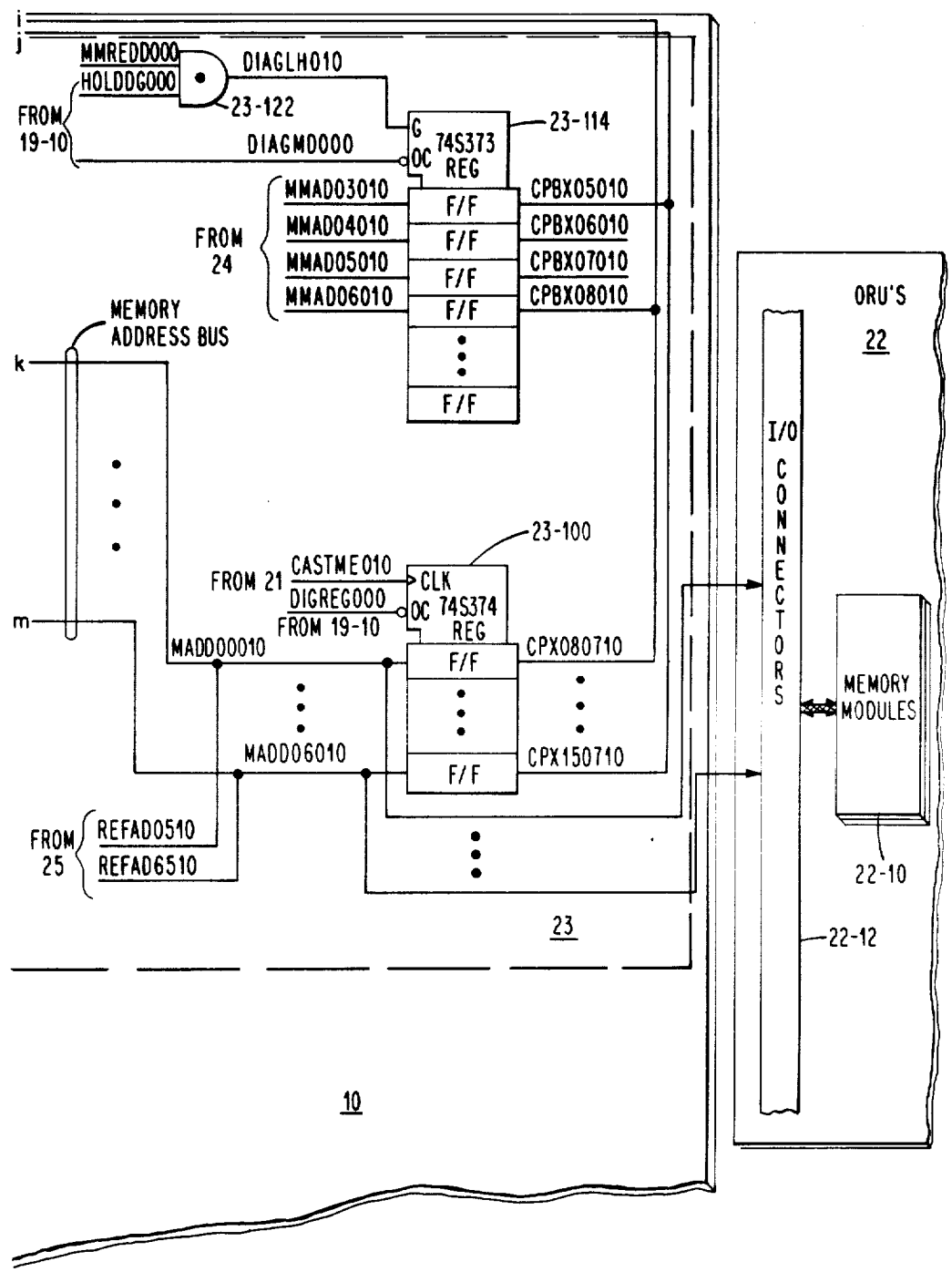
Fig. 2a. (sheet 3 of 3)

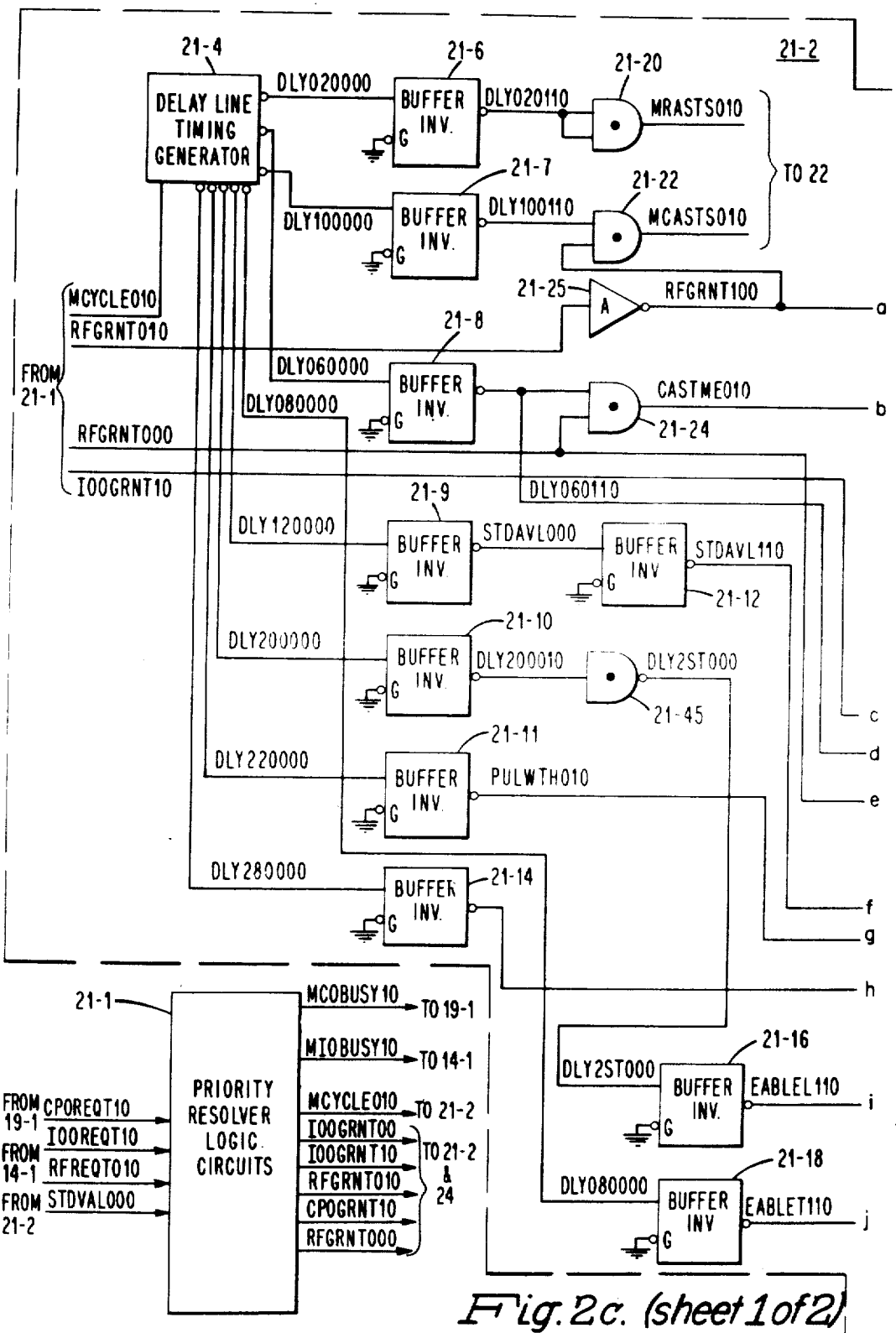
Fig. 2c. (sheet 1 of 2)

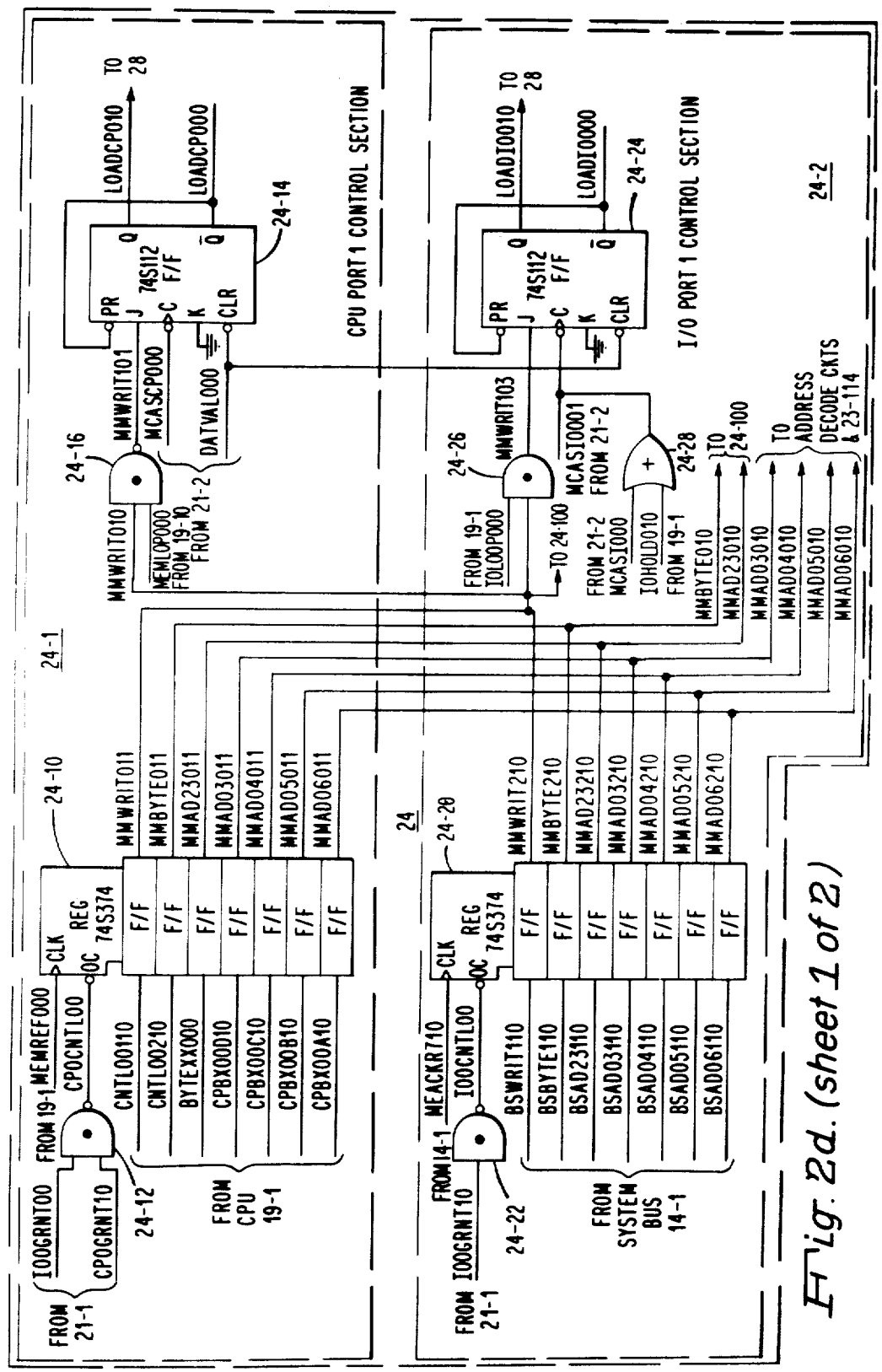
Fig. 2d. (sheet 1 of 2)

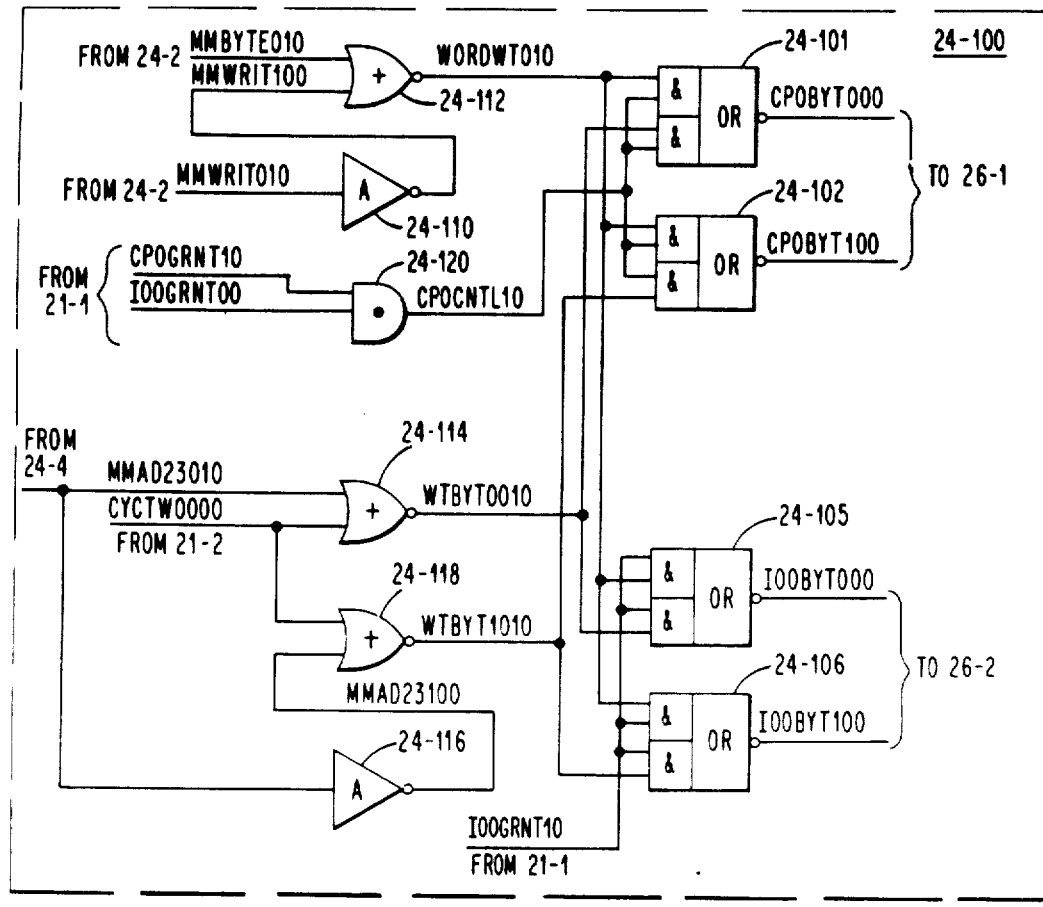
Fig. 2d. (sheet 2 of 2)

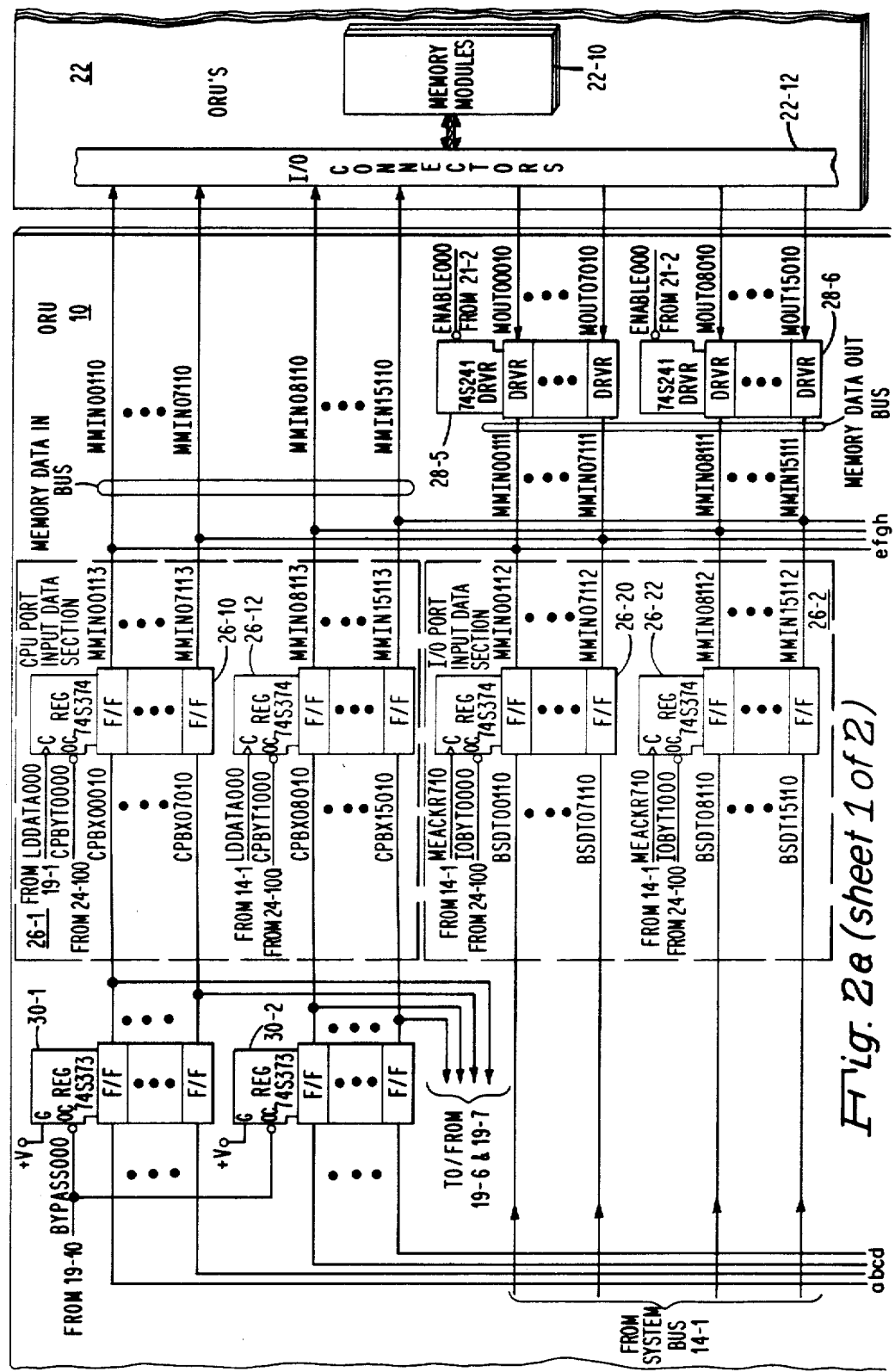

MEMORY ARCHITECTURE FOR FACILITATING OPTIMUM REPLACEABLE UNIT (ORU) DETECTION AND DIAGNOSIS

RELATED APPLICATIONS

The following patent applications assigned to the same assignee as named herein have related subject matter and are incorporated by reference herein as to the extent necessary.

1. "Priority Resolver with Lowest Priority Level Having Shortest Logic Path", invented by Daniel A. Boudreau and Edward R. Salas, bearing Ser. No. 06/449,703, filed on Dec. 14, 1982.
2. "Technique for Determining Maximum Physical Memory Present in a System and for Detecting Attempts to Access Nonexistent Memory", invented by Daniel A. Boudreau and Edward R. Salas, bearing Ser. No. 06/481,107, filed on Mar. 31, 1983.
3. "Memory Identification Apparatus and Method", invented by Edward R. Salas, Edwin P. Fisher, Robert B. Johnson, Chester M. Nibby, Jr. and Daniel A. Boudrea, bearing Ser. No. 06/480,964, filed on Mar. 31, 1983.
4. "Distributed Priority Network Logic for Allowing a Low Priority Unit to Reside in a High Priority Position", invented by Daniel A. Boudreau, Edward R. Salas and James M. Sandini, bearing Ser. No. 06/453,406, filed on Dec. 27, 1982.
5. "Asynchronous Multiport Parallel Access Memory System for Use in a Single Board Computer System, invented by Daniel A. Boudreau and Edward R. Salas, bearing Ser. No. 06/504,751, filed on June 15, 1983.

BACKGROUND OF THE INVENTION

1. Field of the Invention

The present invention relates to data processing systems and more particularly to apparatus for isolating errors within a data processing system which includes a multiport memory system.

2. Description of the Prior Art

It is well known to include apparatus within a data processing system for diagnosing which subsystem within a system has failed. Generally, the subsystems are required to connect to and share common interfaces and buses.

Systems have been provided for testing subsystems which connect to a memory system via a common system bus. A first such system is disclosed in U.S. Pat. No. 4,159,534 entitled "Firmware/Hardware System for Testing Interface Logic of a Data Processing System". In this system, means are provided for testing bus interface logic circuits of the subsystem by generating incorrect memory address on the common system bus. This prevents the memory system from acknowledging the address while permitting the data applied to the bus by the subsystem to be returned to the subsystem's input registers for comparison. This system has been found to provide limited isolation capabilities. That is, a malfunction of the common system bus or the memory system could also produce the detected error condition.

Another data processing system has provided an arrangement for testing a data path between the registers of a processing unit at a local common bus interface and internally within the processing unit. This arrangement is disclosed in the copending patent application of Virenda S. Negi and Steven A. Tague entitled "Diagnostic Testing of the Data Path in a Microprogrammed Data Processor", Ser. No. 06/250,820, filed on Apr. 3, 1981 and assigned to the same assignee as named herein. The data path is tested by transferring different combinations of data signals having good and bad parity through the registers within the established path and comparing the input and output data signals. While the arrangement verifies the established data path between registers, it is still not possible to isolate the error condition between the common bus and the other subsystems or units which connect to the common bus.

While the above prior art systems are able to diagnose specific types of errors or faults within certain subsystems, these systems normally include memory systems in which data and address paths located on a main board are connected in common with the data and address paths of the memory modules or pacs, all of which are contained on separate memory boards. The diagnostic procedure for testing the data and address paths has been to include diagnostic software which generates read and write memory commands for addressing different locations within the different memory modules writing known patterns there and reading them out. If the data and address paths, in addition to the memory module, are operational, the patterns will match. If anything within the paths or module has failed, a mismatch will occur. When it does, it still is not possible to isolate the error to the memory board of memory module being addressed or to the main board address and data paths.

Because of greater accessability, similar, more extensive programs employed for factory testing have utilized similar testing procedures. While in this type of testing environment, it is easier to isolate the problem area, it still is difficult to access certain boards for probing within an assembled system.

Accordingly, it is a primary object of the present invention to provide an arrangement which allows faults or errors within a data processing system to be isolated with greater specificity and ease.

It is a further object of the present invention to include a minimum of additional apparatus within a system for diagnosing faults within the replaceable units or subsystems associated with memory system.

SUMMARY OF THE INVENTION

The above and other objects of the present invention are obtained in a preferred embodiment of the system of the present invention which includes a multiport memory system which is accessible directly by at least one central processing unit through one CPU port or by a plurality of I/O controllers via a system bus through at least one I/O port. Each port includes address, data in, data out, timing and command control circuits which permit the CPU or system bus I/O controllers to access and store data in memory independently. The organization and arrangement of ports is the subject of the related copending patent application titled "Asynchronous Multiport Parallel Access Memory System for Use in a Single Board Computer System".

The circuits of each memory port in addition to the CPU are included in a single computer main board. The memory modules or pacs are included on one or more memory auxiliary boards which plug into I/O connectors contained on the main board. The address and data paths of the I/O and CPU ports connect in common and to the I/O connectors (i.e., wire ORed together) for transmitting and receiving memory addresses and data between the memory ports and memory modules. The apparatus of the present invention includes at least one register which connects between the memory port address path common point and the CPU. Additionally, the apparatus includes a minimal number of control circuits which couple to data registers included within the existing data paths of the memory ports. When the CPU is placed in a diagnostic mode of operation, it generates signals under microprogram control which condition the address register and port data registers via the control circuits to store signals representative of the address and data being transmitted to the memory modules. The CPU under microprogram control is thereafter able to compare the stored signals with the address and data for determining whether the main board has failed and, if so, which port.

By including a small amount of apparatus, it is now possible to verify the operation of the port address and data paths up to the I/O connectors. This includes address lines which couple to the I/O connectors, the associated control and address registers, priority logic and timing circuits of at least one port, here the CPU memory port. In the case of data, it includes the data lines which couple to the I/O connectors, associated port input and output data registers of at least one memory port, here the CPU memory port. It is also possible to verify the operation of the I/O memory port address and data paths either via the system bus or by the inclusion of another data register which bypasses the system bus enabling direct testing.

The invention enables the above verification to take place without requiring any testing of the memory modules. Accordingly, the modules do not have to be plugged into the system. In a factory environment, this greatly facilitates testing. Without the memory modules, all of the parts of the main board are more easily viewed and, therefore, easy to probe.

Thus, the present invention provides an inexpensive reliable way of testing a multiport memory system and determining the optimum replaceable unit (ORU) which is bad. It enables the memory system to be subdivided into a number of ORUs for ease of field maintenance.

In the preferred embodiment, the ORUs correspond to the main single computer board and each auxiliary memory module board which plugs into the main board. As a result of testing, the CPU is able to signal which ORU should be replaced. That is, after having verified the operation of address and data paths, the CPU tests the memory modules in the conventional manner by writing and reading data patterns. When an error or non-comparison is detected, the CPU is able to accurately identify that the memory module board is the ORU which has failed. Additionally, the invention facilitates in-depth microdiagnostic testing of the single computer board memory system in a factory test environment by enabling such testing to take place without memory modules.

The novel features which are believed to be characteristic of the invention both as to its organization and method of operation, together with further objects and advantages will be better understood from the following description when considered in connection with the accompanying drawings. It is to be expressly understood, however, that each of the drawings are given for the purpose of illustration and description only and are not intended as a definition of the limits of the present invention.

BRIEF DESCRIPTION OF THE DRAWINGS

FIGS. 2a through 2e show in greater detail different portions of the memory system of FIG. 1.

DESCRIPTION OF THE PREFERRED EMBODIMENT

Figure 1:
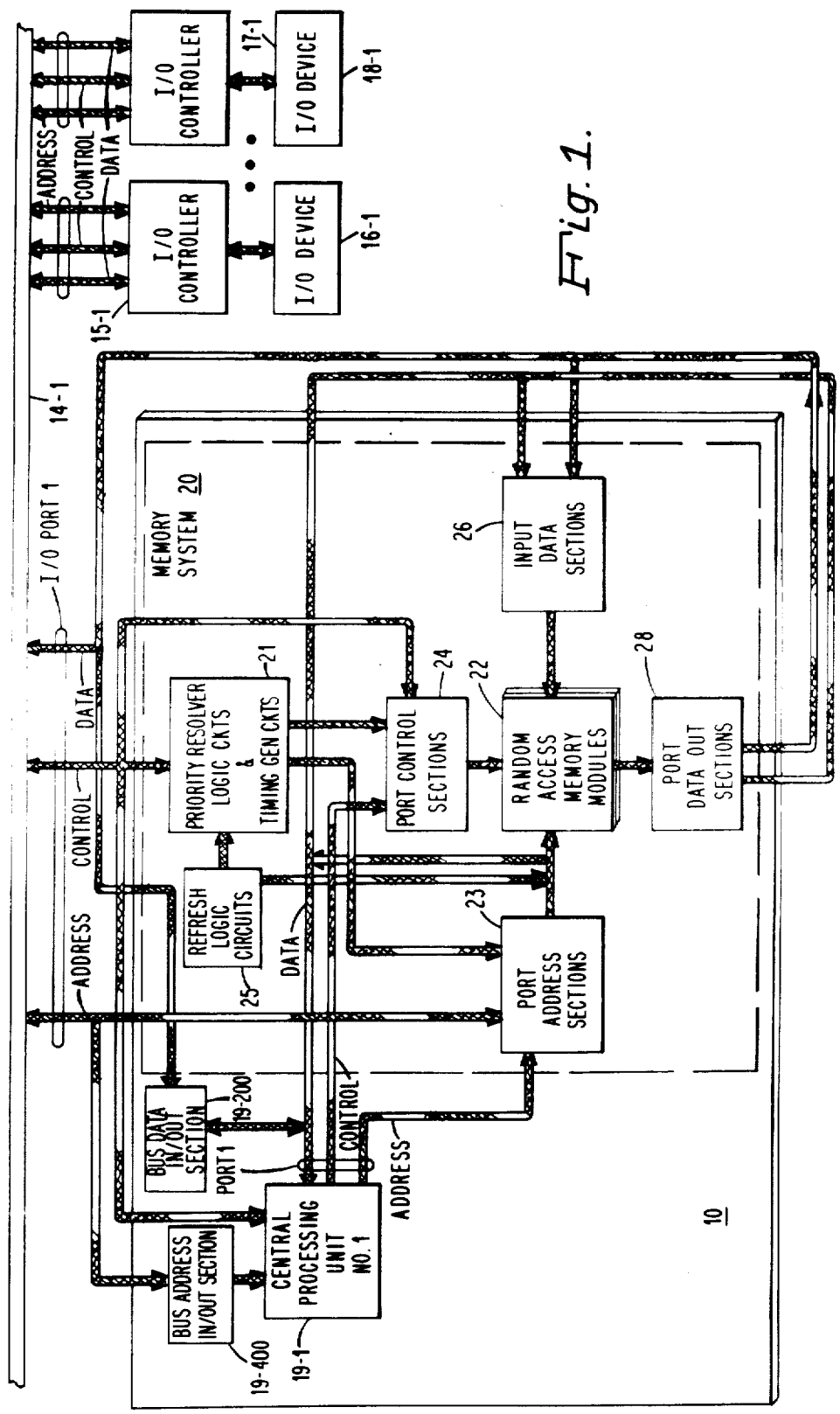
FIG. 1 is a block diagram of a preferred embodiment of the present invention which includes a data processing system constructed to incorporate the diagnostic apparatus of the present invention.

FIG. 1 shows a data processing system of the preferred embodiment. As seen from the Figure, the system includes a central processing unit (CPU) section 19-1, a main memory system 20, and a system bus 14-1. The system bus 14-1 has at least two I/O controllers 15-1 and 17-1 with associated I/O devices 16-1 and 18-1, respectively.

The system bus includes a set of address, data and control lines which connect in common to a pair of I/O controllers 15-1 and 17-1 and central processing unit 19-1. Communications on the bus is carried out in an asynchronous manner. The system bus permits any two units to communicate with each other at a given time via a common (shared) signal path. Any unit wishing to communicate, requests a bus cycle. When that bus cycle is granted, that unit becomes the master and may address any other unit in the system as the slave. Some types of bus interchange require a response cycle (read memory operation for example).

In cases where a response cycle is required, the requestor assumes the role of the master, indicates that a response is required, and identifies itself to the slave. When the required information becomes available (depending on the response time), the slave now assumes the role of the master, and initiates a transfer to the requesting unit. This completes the interchange which has taken two bus cycles in this case. Intervening time on the bus between these two cycles may be used for other system traffic not involving these two units.

A distributed tie-breaking network provides the function of granting bus cycles and resolving simultaneous requests for use of the system bus. Priority is granted on the basis of physical position on the system bus, the highest priority being given to the first unit on the bus. Logic circuits which accomplish the tie-breaking function are distributed identically among all units connected to the bus. In a typical system, the system memory is granted the highest priority and the central processor is granted the lowest priority with the other units being positioned on the basis of their performance requirements. For further information, reference may be made to U.S. Pat. No. 3,997,896, issued Dec. 14, 1976.

In the preferred embodiment, the central processing unit section 19-1 and main memory system 20 are included on a single computer board. As such, the CPU has direct access to memory, thus eliminating the need to communicate over the system bus.

The main memory system 20 includes a plurality of random access memory (RAM) module boards 22 constructed from MOS semiconductor chips. The module boards 22 and associated address and selection circuits may take the form of the circuits disclosed in the related patent application titled "Memory Identification Apparatus and Method". The semiconductor chips are periodically refreshed by the refresh circuits of block 25 which can be considered conventional in design.

The refresh circuits of block 25 apply input signals to priority resolver logic circuits and timing generator circuits included in block 21 of system 20. The priority resolver logic circuits in addition to receiving requests from the refresh circuits also receive memory requests from the I/O port and CPU port as shown. The priority resolver logic circuits operate to resolve competing requests from CPU 19-1, the system bus 14-1 originating from the I/O controllers associated therewith and the refresh circuits of block 25.

In the preferred embodiment, the priority resolver logic circuits take the form of the circuits disclosed in the related patent application titled "Priority Resolver with Lowest Priority Level Having Shortest Logic Path".

The priority resolver circuits assign priority levels to the different requests such that refresh requests have the highest priority, system bus I/O requests have the next highest priority and CPU requests have the lowest priority.

Output grant signals indicative of the resolution of priorities during a resolution cycle are applied as inputs to the timing generator circuits of block 21 together with signals indicating the start and end of a memory cycle. The timing generator circuits operate to generate the required sequence of timing signals for carrying out a memory read or memory write cycle of operation, in response to requests from the CPU and system bus I/O ports.

Timing signals are applied to the address sections of CPU section 19-1 and system bus I/O port included in block 23. The address sections of block 23 include register circuits which store address signals of a memory command or request asynchronously received from CPU section 19-1 or the I/O controller connected to system bus 14-1. Timing signals from the circuits of block 21 transfer the address signals to the RAM module boards 22 during a memory read or write cycle of operation.

Also, timing signals in addition to output grant signals from the priority resolver circuits are applied as inputs to the control sections of the CPU and system bus I/O port of block 24. The control section of each port includes register and control logic circuits. The register circuits receives and store signals asynchronously from either from CPU section 19-1 or system bus 14-1 which are coded to specify the type of memory request to be processed. The control circuits combine signals from the register circuits and generate signals which are applied to the memory module boards 22 for establishing whether the memory is to perform a read, write or read followed by a write cycle of operation (i.e., for a byte command). Additionally, the control circuits apply enabling control signals to the data input sections 26 for CPU section 19-1 and the system bus I/O port to transfer data signals to memory module boards 22 during a write cycle of operation.

The data input sections of the CPU and system I/O ports of block 26 include register circuits for storing data signals asynchronously received either from CPU 19-1 or from an I/O controller of system bus 14-1. Under the control of the enabling signals from corresponding control sections, the signals are applied to the memory module boards 22.

Additionally, the port control circuits section 24 apply control signals to the data output sections of block 28 for CPU section 19-1 and the system bus I/O port. The data out sections of block 28 include register circuits for storing data signals read out from the memory module boards 22 during a read cycle of operation.

CENTRAL PROCESSING UNIT SECTION 19-1

Figure 2A:
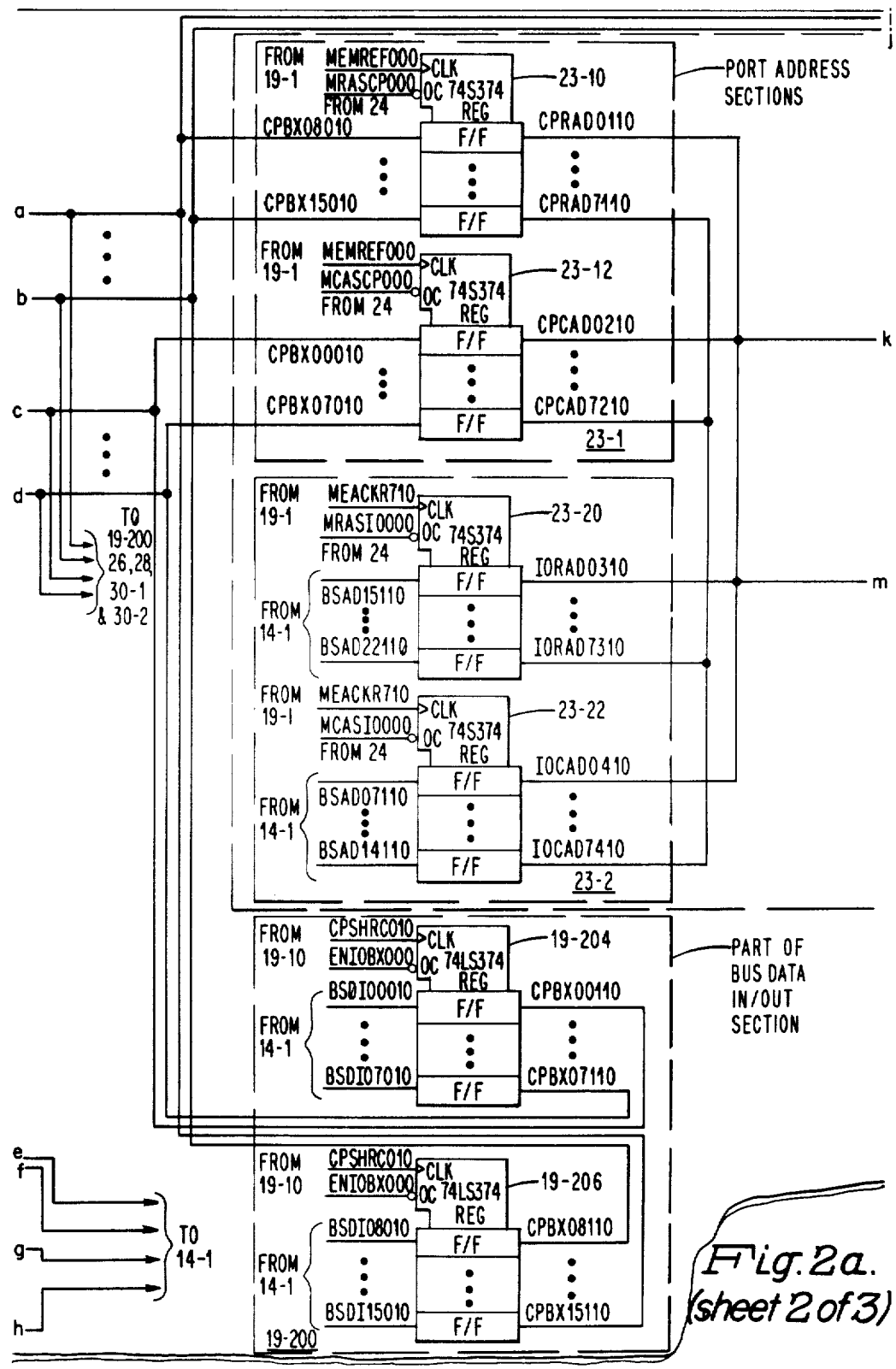
Figure 2B:
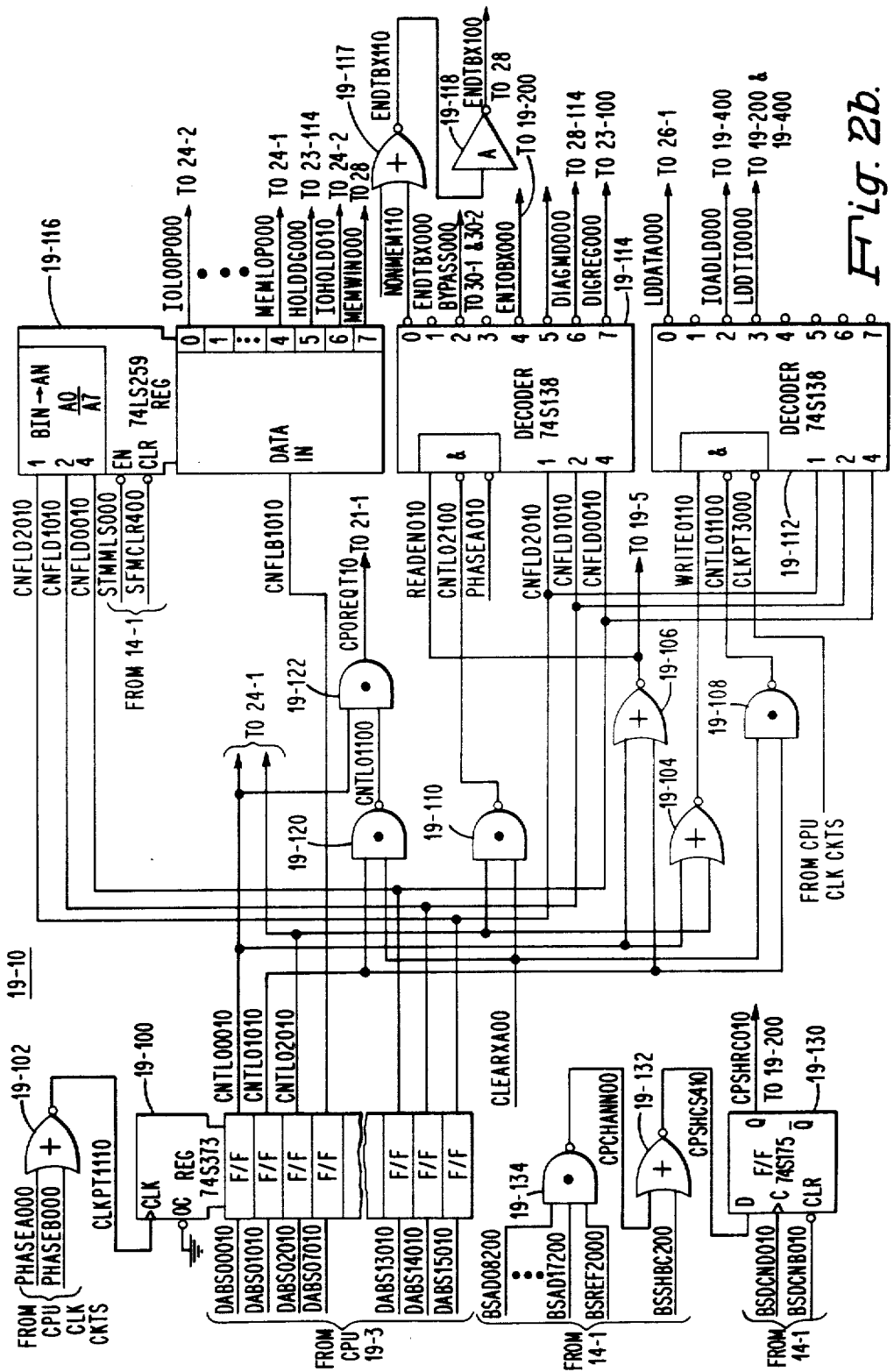

FIGS. 2a and 2b show in greater detail the circuits of CPU section 19-1. As seen from FIG. 2a, section 19-1 includes a 16-bit microprocessor chip 19-3 capable of performing arithmetic logic and control operations. The microprocessor is driven by a 48-bit external read only storage unit 19-2 which is horizontally microprogrammed so as to allow up to 12 simultaneous microoperations per 48-bit word.

The CPU section 19-1 is organized so as to be functionally equivalent to the CPU described in U.S. Pat. No. 4,340,933 which issued July 20, 1982 and is assigned to the same assignee as named herein. As such, the CPU 19-3 has a number of sections which will be described only briefly. These sections include a data manipulation section (including ALU), an internal bus section, processor bus section and a control section. The processor bus section includes 20 address/data bus lines to which signals DABSOD010-OA010 and DABS00010-15010 are applied. These lines are bidirectional when a phase A clocking signal is in a low state.

The internal bus section is 20 bits wide and is used to communicate information between the other areas. It has a plurality of information sources which include the processor bus section and elements of the data manipulation section. The data manipulation section includes P, G and Q registers, a register file (scratchpad), an arithmetic and logic unit (ALU), and a shifter. The P register, loadable from the internal bus, is a 20-bit memory address register that contains either the program counter value or a logical memory address which can be incremented or decremented and transferred to the internal bus. The G register, loadable from the internal bus, is a 20-bit register used to hold addresses for ALU operations. It couples to one port (B) of the ALU. The Q register also loadable from the internal bus section provides operand shifts and holds secondary operands for the ALU. It also couples to the B port of the ALU.

The register file, loadable from the ALU or the internal bus, includes seven 16-bit data registers, seven 20-bit address registers, six 16-bit (DW1-5) and five 20-bit (AW1-5) temporary registers. The register file output couples to the other port (A) of the ALU.

During the interval defined by the high state of a signal, phase A, the address for the selected register, is generated under the control of register file address field of the microinstruction word. The contents of the selected register are read out during the same interval and latched in an output register during an interval defined by the low state of the phase A signal. The contents are applied to either port A of the ALU or to the internal bus as defined by a special control field of the microinstruction word. Information is written into the selected register near the end of the phase A low state interval.

The ALU has the A and B ports mentioned above which can accept either a 16- or 20-bit operand value from the register file. The A port can also select a zero input value under microinstruction control. The B port can have the G register, 16, 8 or 7 bits right justified from the Q register and a zero input value.

The control area includes input latches which store information used for internal control operations, testable registers and next address generation circuits. The testable registers include an F register and temporary flip-flops. The F register is a 16-bit instruction register loadable from the internal bus section whose bits are testable under microprogram control.

The temporary flip-flops are loaded during each microinstruction word cycle.

The next address generation circuits sequence the PROM storage unit 19-2 and include a push/pop LIFO stack array used for subroutine return operations, in addition to test branch matrices for causing branches based upon test conditions.

For further information about the chip construction, reference may be made to the article "The LSI-6 A 16-Bit Minicomputer Compatible Microprocessor" by John DeFalco, Peter Heslin and Ronald Springer, published in the Proceedings of The 1982 *Custom Integrated Circuits Conference by the Institute of Electronic and Electrical Engineers* (IEEE), Copyright 1982.

Additionally, as seen from FIG. 2a, section 19-1 includes the control circuits of block 19-10, a pair of transceiver circuits 19-6 and 19-7 and a group of driver circuits of block 19-8 and a control AND gate 19-5. The control circuits of block 19-10 and each group of circuits 19-6 through 19-8 couple to the processor address-/data bus as shown. The circuits 19-6 and 19-7 also couple to lines CPBX00-15 of the CPU external bus to which signals CPBX00010-15010 are applied, while the driver circuits 19-8 couple to section 24-1. Each of the circuits 19-6 through 19-8 is connected to be enabled by grounding its OC terminal.

The AND gate 19-5 in response to signals READEN010 and PHASEA000 generates directional signal L6DTIN010 which is applied to the DIR terminals of circuits 19-6 and 19-7. The state of this signal establishes the direction of information transfer through the transceiver circuits 19-6 and 19-7. When signal L6DTIN010 is a binary ONE, information is transferred from the CPU's external bus to the address/data bus. When signal L6DTIN010 is a binary ZERO, information is transferred from the address/data bus to the CPU external bus.

FIG. 2b shows a portion of the control circuits of block 19-10. These circuits include the bus logic circuits which determine access to system bus 14-1 on a priority basis, the circuits which enable the bus data in registers of section 19-200 of FIG. 2a and the circuits which under microprogram control generate the required sequences of control signals for conditioning the various sections of the single board computer 10 to carry out the diagnostic operations of the present invention.

In greater detail, as seen from FIG. 2b, the control circuits of block 19-10 includes an input register 19-100 which couples to the data/address bus lines DABS00-15 of the processing unit which for the purposes of the present invention can be considered conventional in design. Under microprogram control, the CPU 19-3 applies control signals DABS00010 through DABS15010 to the input terminals of a 16-bit D-type latch register. During each CPU microinstruction cycle of operation, the states of these signals are loaded into register 19-100. Loading occurs when the CPU clocking circuits force either clocking signal PHASEA000 or PHASEB000 to a binary ZERO causing a NOR gate 20-102 to force input clock signal CLKPT1110 to a binary ONE. The signals are latched into register 19-100 when signal CLKPT1110 switches from a binary ZERO to a binary ONE.

As shown, different output signals of register 19-100 are applied to a pair of NOR gates 19-104 and 19-106, a pair of NAND gates 19-108 and 19-110 and a pair of 3 to 8 decoder circuits 19-112 and 19-114, as shown. The decoder circuit 19-112 is enabled for operation when NOR gate 19-104 forces write enable decode signal WRITE0110 to a binary ONE and NAND gate 19-108 forces control signal CNTL01100 to a binary ZERO upon clocking signal CLKPT3000 being forced to a binary ZERO by the processing unit clocking circuits. NOR gate 19-104 forces signal WRITE0110 to a binary ONE when signals CNTL00010 and CNTL02010 are ZEROS. NAND gate 19-108 forces signal CNTL01100 to a binary ZERO when signals CLEARXA00 and CNTL01010 are ONES.

When enabled, decoder circuit 19-112 decodes the input signals CNFLD0010 through CNFLD2010. When the signals CNFLD0010 through CNFLD2010 are binary ZEROS, decoder circuit 19-112 forces load data signal LDDATA000 to a binary ZERO. When signals CNFLD0010 through CNFLD2010 have the values "010" and "011", decoder circuit 19-112 forces I/O address load signal IOADLD000 and load data signal LDDTI0000, respectively, to a binary ZERO.

The decoder circuit 19-114 is enabled for operation when NOR gate 19-106 forces read enable decode signal READEN010 to a binary ONE, and NAND gate 19-110 forces control signal CTL021000 to a binary ZERO upon clocking signal PHASEA010 being forced to a binary ZERO. NOR gate 19-106 forces signal READEN010 to a binary ONE when signals CNTL00010 and CNTL01010 are binary ZEROS. NAND gate 19-110 forces signal CNTL02100 to a binary ZERO when signals CLEARXA00 and CNTL02010 are binary ZEROS.

When enabled, decoder circuit 19-114 decodes input signals CNFLD0010 through CNFLD2010. When these signals have the values "000", "010" and "110", decoder circuit 19-114 forces end of transfer signal ENDTBX000, a bypass signal BYPASS000 and diagnostic mode signal DIAGMD000, respectively, to a binary ZERO. The signal ENDTBX000 is applied as an input to a NOR gate 19-117 where it is combined with a nonexistent memory signal NONMEM110 (normally a binary ZERO), and the resulting output signal ENDTBX110 is inverted by an inverter circuit 19-118. When signals CNFLD0010 through CNFLD2010 have the value "111", decoder circuit 19-114 forces diagnostic register signal DIGREG000 to a binary ZERO.

Additionally, signals CNTL00010, CNT01010 and CLEARXA00 are combined within a pair of series connected gates 19-120 and 19-122 to generate CPU request signal CPOREQT10.

When either signal CLEARXA00 or signal CNTL01010 is a binary ZERO, NAND gate 19-120 forces signal CNTL01100 to a binary ONE. Signal CNTL01100 conditions AND gate 19-122 to force request signal CPOREQT10 to a binary ONE when signal CNTL00010 is a binary ONE.

Also, signal CNFLB1010 from register 19-100 is applied to a data in terminal of an 8-bit addressable latch register 19-116. When signal SFMCLR400 applied to a clear (CLR) terminal is a binary ONE and signal STMMLS000 applied to an enable (EN) terminal is a binary ZERO, the signal CNFLB1010 is written into the addressed latch selected by signals CNFLD2010-

CNFLD0010 of register 19-116. When signal STMMLS000 is switched to a binary ONE, the bit contents of the addressed latch are not affected by the inputs. That is, they remain in their current state. When signals CNFLD0010 through CNFLD2010, applied to the select inputs of register 19-116, have the values "000", "100", "101", "110" and "111", respectively, and signal STMMLS000 is low, latches 0, 4, 5, 6 and 7, respectively, are loaded with the value of signal CNFLB1010. Thus, the contents of these latches define the states of I/O loop signal IOLOOP000, a memory loop signal MEMLOP000, a hold diagnostic register signal HOLDDG000, an I/O hold signal IOHOLD010, and a bus memory win signal MEMWIN000.

Lastly, the circuits of block 19-10 include those bus logic circuits which operate to generate a CPU second half receive cycle signal CPSHRC010 which is applied as an input to the bus data register circuits of block 19-200. As shown, these circuits include a positive edge triggered D-type flip-flop 19-130 with associated series connected input gate circuits 19-134 and 19-132. Flip-flop 19-130 and each of these gates couple to system bus 14-1 and receive the bus signals shown. When the bus address signals BSAD08200 through BSAD17200 and bus memory reference signal BSREF2000 are all binary ONES, NAND gate 19-134 forces CPU channel number signal CPCHANN00 to a binary ZERO. This, in turn, causes NOR gate 19-132 to force signal CPSHCS410 to a binary ONE during the second half bus cycle interval that signal BSSHBC200 is a binary ZERO. This causes flip-flop 19-130 to be switched to a binary ONE when a bus data cycle signal BSDCND010 switches to a binary ONE. Flip-flop 19-130 is reset to a binary ZERO at the end of the data cycle when signal BSDCNB010 switches to a binary ZERO, flip-flop 19-130 is reset to a binary ZERO.

BUS ADDRESS AND DATA SECTIONS 19-400 and 19-200

FIG. 2a also shows in greater detail, the register circuits of sections 19-400 and 19-200. The circuits of section 19-400 include five positive edge triggered D-type tristate flip-flop registers 19-402 through 19-412 (i.e., registers 19-402, 19-404, 19-406, 19-410 and 19-412). The least significant bit positions of register 19-402 are connected to receive module address signals DABSOD010 through DABSOA010 from the processor address/data bus via driver circuits 19-8. The remaining bit positions are connected to store ZEROS. The register 19-402 is loaded when clocking signal LDDTI0000 is a binary ONE. The register which is enabled by connecting an output control (OC) terminal to ground applies address signals MYAD00010 through MYAD07010 as inputs to the address lines of system bus 14-1. The other two registers 19-404 and 19-406 receive row and column address signals from the CPU external bus. The signals are loaded into the registers when clocking signal IOADLD000 switches to a binary ONE. When the bus priority circuits of block 19-10 grant CPU 19-3 access to system bus 14-1, this results in signal CPUWIN000 being forced to a binary ZERO. This applies the address contents of registers 19-404 and 19-406 which correspond to signals CPA080010-23010 to the address lines of system bus 14-1.

The pair of registers 19-410 and 19-412 couple to system bus 14-1 for receiving an I/O controller address which is to be applied to the address lines of system bus 14-1 during the second half of the bus cycle wherein the memory system 20 returns memory data in response to a previous I/O contoller request. The I/O controller address which corresponds to signals BSDI00010-15010 is loaded into the registers 19-410 and 19-412 when memory acknowledgement signal MEACKR710 switches to a binary ONE by the bus logic circuits of block 19-10. The address contents of these registers which correspond to signals MEAD08010-23010 are applied to the address lines of system bus 14-1 when the bus priority logic circuits grant memory system 20 access to system bus 14-1 and force signal MEMWIN000 to a binary ZERO.

Bus data in/out section 19-200 includes four 8-bit positive edge triggered D-type tristate flip-flop registers 19-204 and 19-206. The pair of data out registers 19-201 and 19-202 shown in FIG. 2e have their input terminals coupled to the CPU external bus for receiving data to be transferred to the data lines of system bus 14-1. The signals which correspond to signals CBX00010-15010 are loaded into the registers when signal LDDTI0000 is a binary ONE. The data contents of the registers are applied to the system bus 14-1 when the bus priority circuits of block 19-10 grant CPU 19-3 access to the system bus and force signal CPUWIN000 to a binary ZERO.

The pair of data-in registers 19-204 and 19-206 shown in FIG. 2a, have their input terminals coupled to system bus 14-1. The data signals applied to the data lines of the system bus during the second half of a bus cycle are loaded into the registers when signal CPSHRC010 switches to a binary ONE. The data contents of registers 19-204 and 19-206 are applied to the CPU external bus when enable I/O bus transfer signal ENIOBX000 is forced to a binary ZERO.

ADDRESS SECTIONS OF BLOCK 23

FIG. 2a shows in greater detail, the address register circuits included within the CPU and I/O port address sections of block 23.

As shown, each section includes a pair of 8-bit D-type address registers which connect to the address lines of each port. These registers receive the row and column address portions of the memory command or request generated by CPU 19-3 or I/O controller connected to the port.

In greater detail, the address section 23-1 of FIG. 2a for CPU 19-1 includes registers 23-10 and 23-12. The register 23-10 receives address bits 15–22 corresponding to signals CPBX08010 through CPBX15010 of the CPU generated memory command address (row address) via bus lines CPOBX08 through CPOBX15. These signals are loaded into register 23-10 when CPU 19-1 asynchronously forces memory reference signal MEMREF000 positive. The register 23-12 receives address bits 7–14 corresponding to signals CPBX00010 through CPBX07010 of the CPU memory command address (column address via bus lines CPOBX00 through CPOBX07). The remaining high order memory command address bits (module address) are applied to the CPU control section as explained herein. Again, address bits 7–14 are loaded into register 23-12 when CPU 19-1 asynchronously forces memory reference signal MEMREF000 positive.

At the beginning of a memory cycle when CPU section 19-1 has been granted priority access to memory, signal MRASCP000 is forced to a binary ZERO, the row address contents of register 23-10 corresponding to signals CPRAD0110 through CPRAD7110 are applied via the memory address bus to the memory modules 22-10. During the same cycle, signal MCASCP000 is forced to a binary ZERO which applies the column address contents (i.e., signals CPCAD0210 through CPCAD7210) of register 23-12 to the memory modules 22-10.

As seen from FIG. 2a, the address section 23-2 of the IO port which connects to system bus 14-1 includes registers 23-20 and 23-22. the register 23-20 is connected to receive row address bits (i.e., signals BSAD15110 through BSAD22110) of an I/O generated memory command address via address lines BSAD15 through BSAD22 of system bus 14-1. Register 23-22 is connected to receive the column address bits (i.e., signals BSAD07110-14110) of the same I/O generated memory command address via address lines BSAD07 through BSAD14.

Both sets of address bits are loaded into registers 23-20 and 23-22 when the requesting I/O controller granted access to bus 14-1 asynchronously forces memory acknowledgement signal MEACKR710 positive. This signal is generated by the bus memory response circuits of the system bus 14-1 when the requesting I/O controller indicates its request for a memory cycle by asynchronously forcing a bus memory reference line BSMREF included as one of the control lines of system bus 14-1 to a predetermined state, and the priority circuits 21-1 of FIG. 2c have signalled that the port is not busy (i.e., signal MIOBUSY10=0). When the circuits of block 21-2 in turn force timing control signals MRASI0000 and MCASI0000 to binary ZEROS, registers 23-20 and 23-22 respectively are conditioned to apply their row and column address contents (i.e., signals IORAD0310-7310) and signals IOCAD0410-7410 to memory modules 22-10 via the memory address bus.

Additionally, section 23, in accordance with the teachings of the present invention, includes an address register 23-100 whose input terminals connect to the memory address bus lines MADD00-06.

As shown, the memory address bus corresponds to the common junctions at which the output terminals of the registers of address sections 23-1 and 23-2 are wired ORed together. The memory address lines are applied as inputs to each of the memory modules boards 22 containing the modules 22-10 via the I/O connectors 22-12 associated therewith.

The memory address bus has as a further source of address signals, the refresh circuits of block 25 which apply refresh address signals REFAD0510 through REFAD6510. The register 23-100 is an 8-bit positive edge triggered D-type tristate flip-flop register. It is loaded with the address signals applied to the memory address bus each time column address timing signal CASTME010 switches to a binary ONE. Its address contents corresponding to signals CPX080710-150710 are applied to the CPU external bus lines CPBX08-15 when signal DIGREG000 is forced to a binary ZERO.

A second diagnostic register 23-114 which also serves an an error status register provides storage for the module address bits corresponding to signals MMAD03010 through MMAD06010 received from control section 24. The register 23-114 is an 8-bit D-type transparent tristate latch register.

An AND gate 23-122 generates hold signal DIAGLH010 in response to signals HOLDDG000 and DIAGMD000 received from CPU section 19-1. Normally, both signals HOLDDG000 and MMREDD000 are binary ONES. This causes AND gate 28-122 to hold signal DIAGLH010 at a binary ONE (high). A high level signal at the gate (G) input terminal of register 23-114 causes the signals at the register output terminals to follow the signals applied to the data input terminals. When AND gate 23-122 forces signal DIAGLH010 low to a binary ZERO, the input address and status signals applied to the data output terminals of register 23-114 are latched in the register. This freezes or holds the contents of the register 23-114.

Freezing occurs when multiple error indication has been detected by error detection and correction (EDAC) circuits, not shown. This causes signal MMREDD000 to switch to a binary ZERO. Freezing also can occur under the control of CPU 19-3 when signal HOLDDG000 is switched to a binary ZERO. When CPU 19-3 forces diagnostic mode signal DIAGMD000 to a binary ZERO, it enables the transfer of the address signals CPBX05010-08010 of register 23-114 to CPU external bus lines CPBX12-15.

PRIORITY RESOLVER LOGIC CIRCUITS AND TIMING AND CONTROL CIRCUITS 22

Figure 2C:
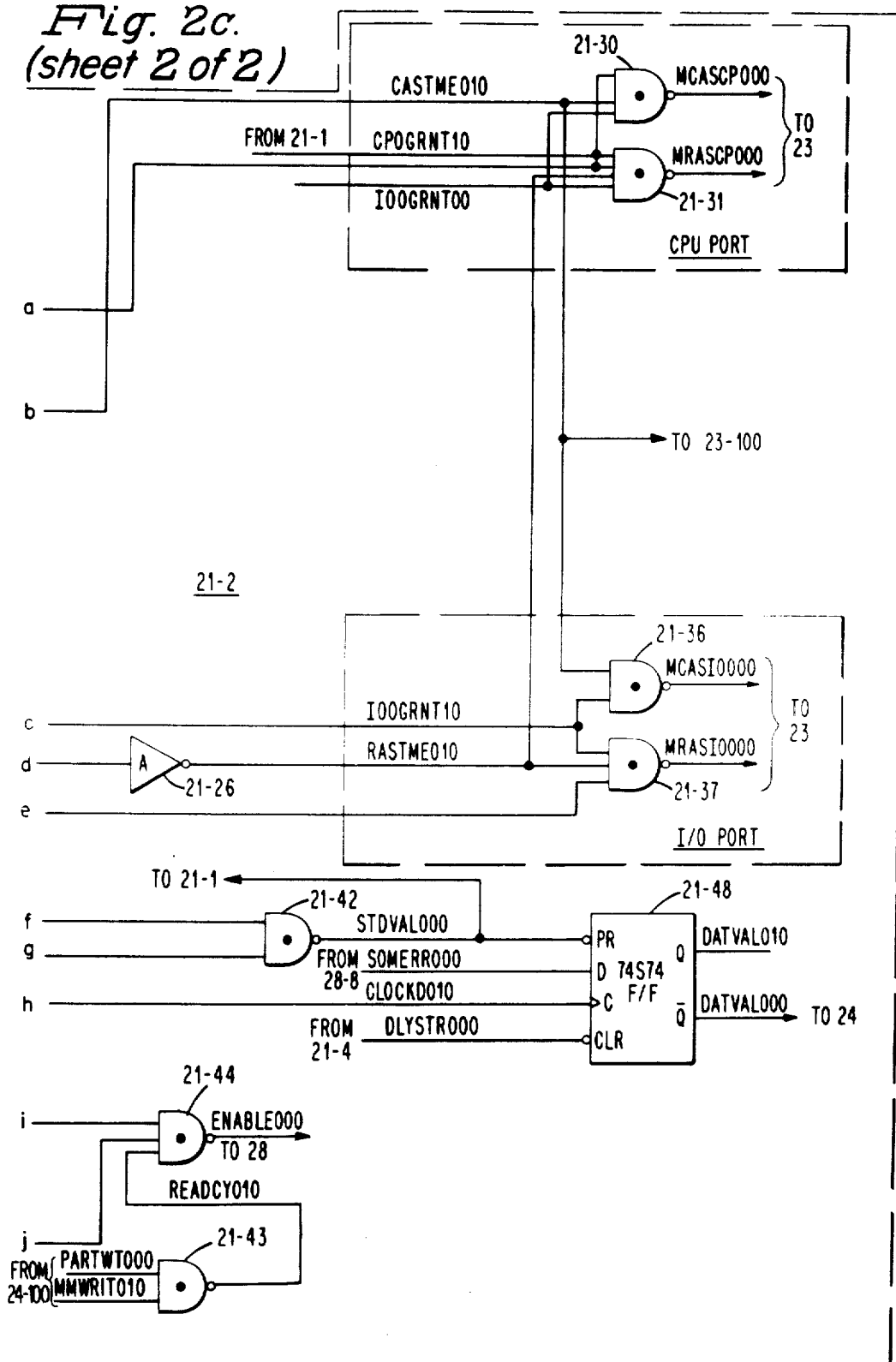

As seen from FIG. 2c, block 21 includes the priority resolver logic circuits of block 21-1 and the timing generator circuits of block 21-2. As discussed above, the priority resolver logic circuits 21-1 include flip-flops and logic circuits arranged according to the related patent application entitled "Priority Resolver with Lowest Priority Level Having Shortest Logic Path". These circuits respond on a priority basis to request from CPU section 19-1 corresponding to requestor signal CPOREQT10 and I/O port 1 corresponding to requestor signal IOOREQT10, in addition to refresh requestor signal RFREQT010 from the circuits of block 25. The request signals are stored in different ones of a first set of ask flip-flop stages.

As a function of the preassigned priority levels, the circuits of block 21-1 generate as outputs, grant signals from each requestor grant flip-flop stage indicating an intermediate result of the priority resolution cycle. For the CPU memory port, this signal corresponds to signal CPOGRNT10. For the I/O port, this signal corresponds to signal IOOGRNT10. The complement of the I/O grant signal IOOGRNT00 is provided. The refresh grant signal and its complement correspond to signals RFGRNT010 and RFGRNT000.

In addition to the above grant signals, the circuits 21-1 generate memory cycle signal MCYCLE010 as an output. This signal is generated by NANDing together all of the complements of the grant signals (e.g. signals CPOGRNT00 and IOOGRNT00). The signal MCYCLE010 when switched to a binary ONE, initiates the beginning of a memory cycle of operation before the ultimate user of the memory system has been determined as explained herein.

Further signals generated by the circuits 21-1 are memory busy signals MCOBUSY10 and MIOBUSY10. Each busy signal when switched to a binary ZERO indicates to the CPU or I/O port associated therewith that memory system 20 has finished with the memory request received from that port. In the case of the I/O port, this signal is applied to bus response circuits of block 19-10 associated with the system bus 14-1 and when a binary ONE, it causes the bus response circuits to generate a wait response indicating that the memory system is busy. When a binary ZERO, each I/O port busy signal enables the generation of a memory acknowledgement signal MEACKR710 as discussed herein.

Each busy signal is generated by ORing the states of the output signals from the ask flip-flop and grant flip-flop stages included in block 21-1. When either a request has been received from the port stored in the ask flip-flop stage, or the grant flip-flop stage of that port has been set to a binary ONE, the port memory busy signal will be forced to a binary ONE. However, when both the ask and grant flip-flop stages are reset to binary ZEROS, this forces the port memory busy signal to a binary ZERO indicating that the memory system has completed the processing of the port request, or stated differently, that the port is available for processing a memory request.

As seen from FIG. 2c, the output grant signals IOOGRNT00 through RFGRNT00, together with memory cycle signal MCYCLE010, are applied as inputs to the timing generator and control circuits of block 21-2. These circuits generate the row address strobe and column address strobe timing signals MRASTS010 and MCASTS010 which are applied to each of the chips of the rows of chips contained in the memory modules 22-10. Additionally, these circuits generate a different set of control address signals (i.e., MCASCP000, and MRASCP000, and MCASIO000 and MRASIO000) for the CPU and I/O memory ports. These sets of signals are applied to the address sections of block 23. They enable the row and column address signals of the port's memory request stored in the section's address registers to be applied to the rows of chips of memory modules 22-10.

Also, the circuits of block 21-2 generate signal STDVAL000 and data valid timing signals DATVAL010 and DATVAL000 whose states indicate when the data being written into or read from memory is valid. The signal STDVAL000 is returned to the priority resolution logic circuits of block 21-1 for enabling the resetting of the CPU grant flip-flop stage. Also, signal DATVAL000 is applied to the control sections of block 24 for enabling data read out from memory modules 22-10 to be latched into the registers of the specified one of the data out sections 28.

In greater detail, it is seen that the circuits of block 21-2 include a delay line timing generator 21-4, conventional in design, and a plurality of buffer-inverter circuits 21-6 through 21-13, 21-14, 21-16 and 21-18, each of which is connected to receive a different one of a plurality of timing signals DLY020000, DLY100000, DLY060000, DLY080000, DLY120000, DLY200000, DLY220000 and DLY280000 from generator 21-4.

The circuits of block 21-2 further include a plurality of AND gates 21-20 21-22 and 21-24, inverter circuits 21-25 through 21-26, a plurality of NAND gates 21-30, 21-31, 21-36, 21-37, 21-42, 21-43 and 21-44 and a D-type flip-flop 21-48. The pairs of NAND gates 21-30 and 21-31 and 21-36 and 21-37 combine different ones of the output grant signals from the circuits 21-1 with the row address time signal RASTME010 and column address time signal CASTME010 derived from timing generator circuit 21-4.

In greater detail, buffer and inverter circuit 21-6, in response to a negative going timing pulse signal DLY020000, conditions AND gates 21-20 to generate row address strobe signal MRASTS010. The signal MRASTS010 is a positive going pulse signal which is generated at the beginning of a memory cycle (i.e., at time 0) in response to signal MCYCLE010 being forced to a binary ONE by circuits 21-1. In general, it has a pulse width from 240-260 nanoseconds.

At the start of a memory cycle, the buffer and inverter circuit 21-7 in response to negative going timing pulse signal DLY100000 conditions AND gate 21-22, in the absence of a memory refresh cycle (i.e., when signal RFGRNT100 is a binary ONE) to generate column address strobe signal MCASTS010. The signal MCASTS010 is a positive going signal which is generated approximately 65-75 nanoseconds after the start of a memory cycle or after the start of row address strode signal MRASTS010. It has a pulse width from 210 to 230 nanoseconds.

The buffer and inverter circuit 21-8 in the absence of negative going timing pulse signal DLY060000 forces signal DLY060110 to a binary ONE. This causes inverter circuit 21-26 to force row address time signal RASTME010 to a binary ONE. The signal RASTME010 is applied as an input to a first NAND gate to each of the pairs of NAND gates 21-30, 21-31 and 21-36, 21-37 included within the CPU and I/O ports. Signal RASTME010 conditions one of the NAND gates 21-31 and 21-37 designated by the priority circuits 21-1 to force its output signal to a binary ZERO. This, in turn, enables the address register circuits of block 23 to apply the row address signals of the memory command being processed to the memory modules 22-10.

In the case of the CPU port 1, signal RASTME010 conditions NAND gate 21-31 to force signal MRASCP000 to a binary ZERO when its grant signal (i.e., CPOGRNT10) is a binary ONE in the absence of a refresh cycle (i.e., signal RFGRNT100 is a binary ONE) when the I/O port has not been granted priority (i.e., signal IOOGRNT00 is a binary ONE). In the case of the I/O port, signal RASTME010 conditions NAND gate 21-37 to force signal MRASI0000 to a binary ZERO when its grant signal (i.e., IOOGRNT10) is a binary ONE in the absence of a refresh cycle having been granted.

When circuit 21-8 forces signal DLY060110 to a binary ONE in response to negative going timing pulse signal DLY060000, AND gate 21-24 is conditioned to force column address time signal to a binary one in the absence of a refresh cycle having been granted (i.e., signal RFGRNT000 in a binary ONE). At that time, signal RASTME010 is forced to a binary ZERO. Signal CASTME010 is applied as an input to a second NAND gate of each of the pairs of NAND gates 21-30 and 21-31 and 21-36 and 21-37 included within the CPU and I/O ports. Signal CASTME010 conditions one of the NAND gates 21-30 and 21-36 designated by the priority circuits 21-1 to force a corresponding one of the output signals MCASCP000 and MCASI0000 to a binary ZERO. This enables the address register circuits of block 23 to apply the column address signals of the memory command being processed to the memory modules 22-10.

The signals MCASCP000 and MCASI0000 are forced to binary ZEROS when the CPU and I/O grant signals have the same states as specified above for forcing timing signals MRASCP000 through MRASI0000 to binary ZEROS.

A first group of series connected buffer and inverter circuits 21-9 and 21-12 together with buffer and inverter circuit 21-11 apply pulse timing signals STDAVL110 and PULWTH010 as inputs to NAND gate 21-42. The timing signals are generated in response to the negative going pulse timing signals DLY120000 and DLY220000, as shown. NAND gate 21-42 forces output signal STDVAL000 to a binary ZERO, in response to negative going timing pulse signal DLY220000 at the end of negative going timing pulse signal DLY120000. This occurs approximately 420 nanoseconds after the start of a memory cycle (i.e., three quarters through the cycle). When a binary ZERO, signal STDVAL000 switches data valid flip-flop 21-48 to a binary ONE via the present (PR) terminal. When signal STDVAL000 is a binary ONE, the flip-flop 21-48 can switch to a binary ONE state earlier in the cycle as a function of an error signal SOMERR000 generated by the error detection and correction (EDAC) circuits. Switching occurs on the leading edge of the positive pulse clocking signal CLOCKD010 which is derived by inverting the negative going pulse signal DLY280000 generated by generator 21-4 via buffer and inverter circuit 21-14. At the beginning of each memory cycle when signal MYCYCLE010 is forced to a binary ONE, signal DLYSTR000 is in turn forced to a binary ZERO. At that time, signal DLYSTR000 resets data valid flip-flop 21-48 to a binary ZERO state.

A second group of series connected buffer and inverter circuits 21-10 and 21-16 together with buffer and inverter circuit 21-18 apply timing signals EABLEL110 and EABLET110 to NAND gate 21-44. The NAND gate 21-44 receives as an additional input, a read cycle signal READCY010 from NAND gate 21-43. These signals are commanded to produce an enable read data signal ENABLE000 which is applied to driver circuits which receive the memory data signals read out from the memory modules 22-10. The signal ENABLE000 when forced to a binary ZERO conditions the drivers to apply memory data signals to the different data out sections of block 28.

CONTROL SECTIONS OF BLOCK 24

FIG. 2d shows in greater detail, the control sections of block 24 for the CPU and I/O memory ports of FIG. 1. Each of the sections 24-1 and 24-2 includes an 8-bit D-type flip-flop control register and a JK negative edge triggered output data load flip-flop with associated NAND gates. More specifically, section 24-1 includes register 24-10 which is connected to receive from CPU 19-1 memory write and byte write signals CNTL00110 and CNTL00210 in addition to memory address bits 23 and 3 through 6 of the CPU generated memory command address.

CPU section 19-1 operates to force signals CNTL00110 and CNTL00210 to the desired states for specifying the type of memory operation to be performed. When set to a binary ONE state, signal MMWRIT011 specifies a memory write operation. By setting signal MMBYTE011 to a binary ONE, a memory partial write (byte) operation will be performed. When both signals MMWRIT011 and MMBYTE011 are binary ZEROS, the operation is a read.

The states of signals BYTEXX000 through CPBXOOA10 generated by CPU section 19-1 are coded to specify which memory module or row of chips within the memory modules are being addressed (i.e., signals CPBX00D10-A10), in addition to which byte within a word (i.e., signal BYTEXX000) is being accessed in the case of a partial write operation.

The signals from CPU section 19-1 are loaded into register 24-10 when the CPU switches memory reference signal MEMREF000 positive. When NAND gate 24-12 forces control signal CPOCNTL00 to a binary ZERO, the control and address contents of register 24-10 are applied to the register output terminals. NAND gate 24-12 forces signal CPOCNTL00 to a binary ZERO when its grant signal CPOGRNT10 is a binary ONE and the grant signal IOOGRNT00 of the higher priority I/O port is a binary ONE.

The signals MMWRIT011, MMBYTE011 and MMAD23011 from section 24-1 are ORed with the corresponding signals from the other sections and the resulting signals MMWRIT010, MMBYTE010 and MMAD23010 are applied to the byte write control logic circuits of block 24-100. The remaining signals MMAD03011 through MMAD06011 are similarly ORed and the resulting signals MMAD03010 through MMAD06010 are applied as inputs to row address decoder circuits, not shown, included within the memory system. For the purposes of the present invention, these circuits may be considered conventional in design. They can take the form of the circuits disclosed in the related patent application entitled "Memory Identification Apparatus and Method".

As seen from FIG. 2d, the resulting memory write signal MMWRIT101 is applied to the J input terminal of CPU load flip-flop 24-14 via an input NAND gate 24-16 together with memory loop signal MEMLOP000. During normal operations, when signal MEMLOP000 is a binary ONE, the flip-flop 24-14 during a read operation (i.e., when signal MMWRIT010 is a binary ZERO) switches output signal LOADCP010 from a binary ZERO to a binary ONE in response to the negative going edge of timing signal MCASCP000. During diagnostic testing, signal MEMLOP000 is forced to a binary ZERO, which also forces signal MMWRIT101 to a binary ONE. This enables flip-flop 24-14 to switch to a binary ONE in response to signal MCASCP000.

Signal MCASCP000 is generated in response to signal CASTME010 when CPU 19-3 has been granted access to memory by the priority circuits 21-1. When timing signal DATVAL00 is forced to a binary ZERO, flip-flop 24-14 switches to a binary ZERO. Signal LOADCP010 is applied to the enable input terminals of the registers included within the data out section associated with CPU 19-3. It operates to latch the data read out from memory into the CPU's data out section registers as explained herein.

Control section 24-2 provides control and address storage and load output register control for the I/O memory port. In greater detail, the register 24-20 is loaded with control and address signals BSWRIT110 through BSAD06110 generated by any one of the I/O controllers connected to system bus 14-1 applied via the bus address and control lines when the requesting I/O controller asynchronously switches signal MEACKR710 positive. This signal is generated by the bus response circuits of block 19-10 associated with system bus 14-1 as described above. When the IO port is granted memory access by priority circuits 21-2, grant signal IOOGRNT10 is forced to a binary ONE. This causes NAND gate 24-22 to force control signal IOOCNTL00 to a binary ZERO which conditions register 24-20 to apply its control and address contents to its output terminals as signals MMWRIT210 through MMAD06210.

Section 24-2 further includes a load flip-flop 24-24 whose J input terminal is connected to receive memory write signal MMWRIT010 and I/O loop signal IOLOOP000 via a NAND gate 24-26. Additionally, the timing signal MCASI000 together with I/O hold signal IOHOLD010 is applied via an OR gate 24-28 to the clocking (C) input terminal.

In response to a memory read command, during normal operation when signal IOLOOP000 is a ONE, when the I/O memory port has been granted access to memory, the circuits 21-2 generate timing signal MCASI0000 whose negative edge switches flip-flop 24-24 to a binary ONE. During diagnostic testing, signal IOLOOP000 is forced to a binary ZERO which causes gate 24-26 to force signal MMWRIT103 to a binary ONE. This enables flip-flop 24-24 to switch to a binary ONE in response to signal MCASI0000 when signal IOHOLD010 is a binary ZERO. When signal IOHOLD010 is forced to a binary ONE, this inhibits flip-flop 24-24 from being switched to a binary ONE in response to signal MCASI000.

The flip-flop 24-24 is reset to a binary ZERO when the circuits 21-2 force timing signal DATVAL000 to a binary ZERO. Signal LOADI0010 is applied to the enable input terminals of the registers included within the data out section associated with the I/O port of system bus 14-1.

The control circuits of block 24 further include the byte write control circuits of block 24-100. As shown in FIG. 2d, these circuits include a plurality of pairs of NAND/NOR gates 24-101, 24-102, 24-105 and 24-106. Each pair of gates provide output signals which are applied to the enable input terminals of the registers included within the data input section of the CPU or I/O port associated therewith for enabling the data to be applied to memory modules 22-10 during a memory write cycle of operation.

A write full word signal WORDWT010 generated by an inverter circuit 24-110 and NOR gate 24-112 is applied as an input to one AND gate of each of the pairs of gates 24-101, 24-102, 24-105 and 24-106. The NOR gate 24-112 forces signal WORDWT010 to a binary ONE when a write non-byte operation is specified by the circuits of sections 24-1 and 24-2 (i.e., signal MMWRIT010 is a binary ONE and signal MMBYTE010 is a binary ZERO).

A first write byte signal WTBYT0010 generated by NOR gate 24-114 applied as an input to another AND gate of one gate of each of the pairs of gates 24-101, 24-102, 24-105 and 24-106 (i.e., 24-101 and 24-105). A second write byte signal WTBYT1010 generated by an inverter circuit 24-116 and NOR gate 24-118 is applied as an input to another AND gate of the other gate of each of the pairs of gates 24-101, 24-102, 24-105 and 24-108 (i.e., 24-102 and 24-106).

The appropriate one of the write byte signals WTBYT0010 and WTBYT1010 is forced to a binary ONE during the second half of a partial write cycle of operation (i.e., signal CYCTW0000 is a binary ZERO) as a function of the state of memory address bit 23 (i.e., signal MMAD23010) furnished by sections 24-1 through 24-4.

In addition to the above signals, each of the pairs of gates 24-101, 24-102, 24-105 and 24-106 is connected to receive corresponding ones of the CPU and I/O grant signals from priority circuits 21-1. More specifically, each one of the pair of gates associated with CPU section 19-1 receives a control signal CPOCNTL10 from an input AND gate 24-120. AND gate 24-120 forces signal CPOCNTL10 to a binary ONE when its CPU grant signal CPOGRNT10 is a binary ONE and the other higher priority I/O port grant signal IOOGRNT00 is a binary ONE.

When a binary ONE, signal CPOCNTL10 partially enables NAND/NOR gates 24-101 and 24-102 so that signals CPOBYT000 and CPOBYT100 switch state as a function of the states of signals WORDWT010, WTBYT0010 and WTBYT1010. That is, when signal WORDWT010 is a binary ONE, gates 24-101 and 24-102 force signals CBOBYT000 and CBOBYT100 to binary ZEROS which enables the transfer of memory data to CPU section 19-1 from the data output section 26-1 as discussed herein. When signal WORDWT010 is a binary ONE, gates 24-101 and 24-102, respectively, force signals CBOBYT000 and CBOBYT100 to binary ZEROS in response to signals WTBTY0010 and WTBYT1010 being forced to binary ZEROS. It will be understood that only one of the signals WTBYT0010 and WTBYT1010 is switched to a binary ZERO as a function of the state of signal MMAD23010.

Each of the pair of gates 24-105 and 24-106 is connected to receive I/O grant signal IOOGRNT10 from priority circuits 21-1. When forced to a binary ONE, signal IOOGRNT10 partially enables NAND/NOR gates 24-105 and 24-106 so that signals IOBYT000 and IOOBYT100 switch state as a function of the states of signals WORDWT010, WTBYT0010 and WTBYT1010 as described above. When gates 24-105 and 24-106 force signals IOOBYT000 and IOOBYT100 to binary ZEROS, this enables the transfer of memory data from data output section 28-2 to the requesting I/O controller connected to I/O port of system bus 14-1.

INPUT DATA SECTIONS OF BLOCK 26

Figure 2E:
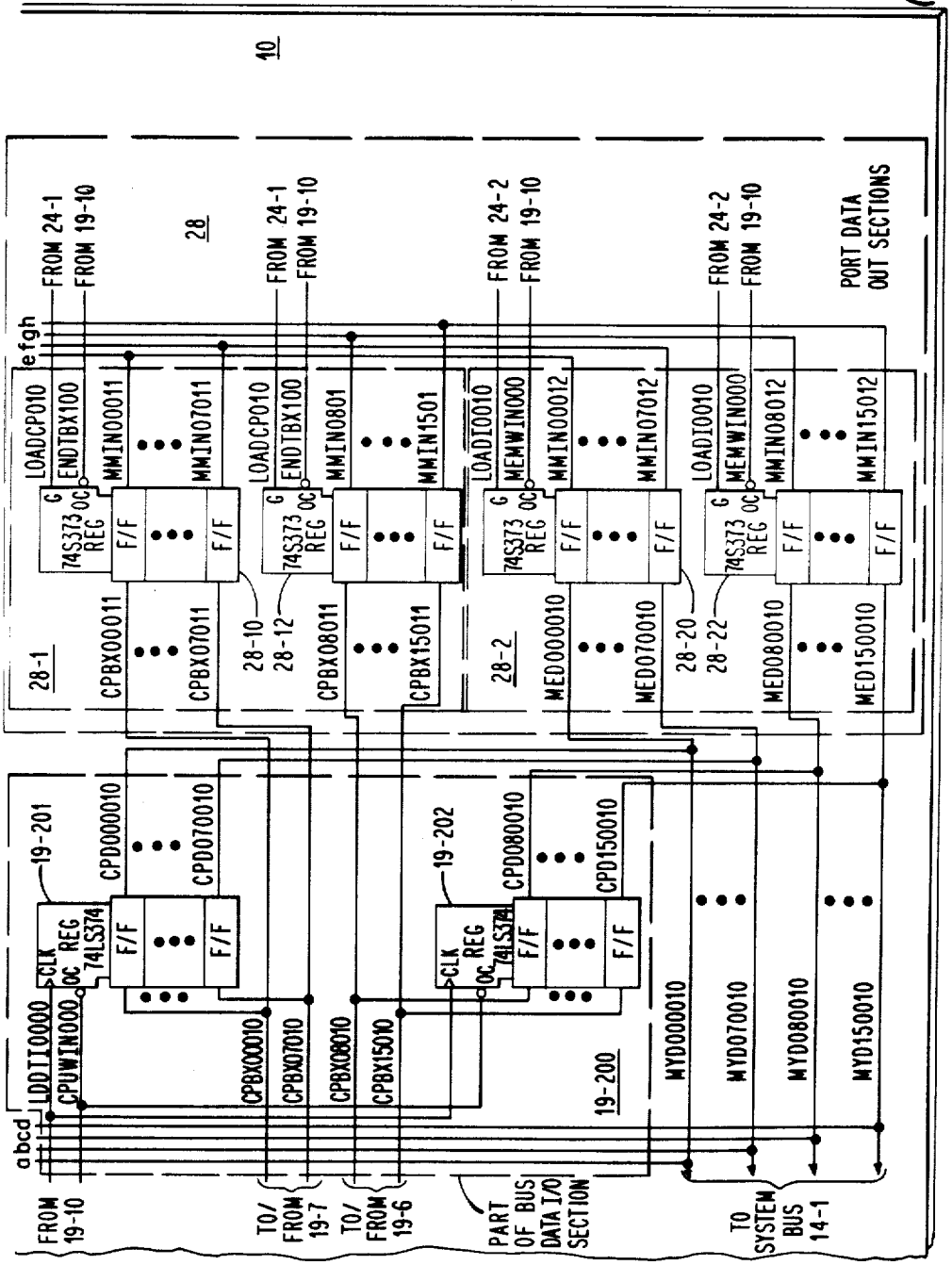

FIG. 2e shows in greater detail, the input data register circuits included within the CPU and I/O port data input sections 26-1 and 26-2 of block 26 of FIG. 1.

As shown, each section includes a pair of 8-bit D-type registers which connect to the data lines of each port. These registers receive the data word portion of the memory write command or request generated by the CPU or requesting I/O controller connected to the port.

In greater detail, the data in section 26-1 for CPU section 19-1 includes registers 26-10 and 26-12. The register 26-10 receives a first byte (signals CPBX00010-07010) of the CPU data word via external bus lines CPBX00 through CPBX07. These signals are loaded into register 26-10 when CPU section 19-1 asynchronously switches load data signal LDDATA000 positive. The register 26-12 receives a second byte (signals CPBX08010-15010) of the CPU data word via external bus lines CPBX08 through CPBX15. Again, the second byte is loaded into register 26-12 when CPU 19-1 asynchronously forces signal LDDATA000 positive.

During a memory write cycle when CPU 19-3 has been granted priority access to memory, signals CPBYT00010 and CPBYT1000 are forced to binary ZEROS by the byte control circuits of block 24-100. This applies the data contents of registers 26-10 and 26-12 of FIG. 2e corresponding to signals MMIN00110 through MMIN15110 via the memory data in bus to the memory modules 22-10. It will be noted that the output terminals of the registers 26-10 and 26-12 in addition to those of registers 26-20 and 26-22 of section 26-2 are ORed together with corresponding output terminals of the registers of the remaining sections forming the memory data in bus.

The data in section 26-2 is identically constructed. As seen from FIG. 2e, the data in section 26-2 of the I/O memory port which connects to the data lines of system bus 14-1 includes registers 26-20 and 26-22. The data word byte of a memory write command received from the requesting I/O controller via data lines BSDT00-15 of bus 14-1 are loaded into registers 26-20 and 26-22 when the I/O controller asynchronously causes memory acknowledgement signal MEACKR710 to be switched positive. The signal MEACKR710 is generated in the manner previously discussed. The data contents of these registers corresponding to signals MMIN00112 through MMIN15112 are applied to memory modules via the memory data in bus during a memory write cycle when signals IOBYT000 and IOOBYT100 are forced to binary ZEROS by the circuits of block 24-100.

DATA OUT SECTIONS OF BLOCK 28

FIG. 2e shows in greater detail, the data register circuits included within the CPU and I/O port data out sections 28-1 and 28-2 of block 28. Additionally, FIG. 2e shows the interface driver circuits 28-5 and 28-6 which couple to the memory data out bus.

As shown, each section includes a pair of 8-bit D-type registers which connect to the input data lines of each port. These registers receive the data word read out from the memory modules 22-10 in response to a memory read command from the particular port. Thereafter, under the control of the CPU or I/O port, the data contents of the registers are transferred to the CPU or requesting I/O controller.

In greater detail, the data out section 28-1 of FIG. 2e for CPU section 19-1 includes registers 28-10 and 28-12. These registers receive the 16 data bits of a word read out from memory modules 22-10 via the tristate driver circuits 28-5 and 28-6. The tristate driver circuits 28-5 and 28-6 are enabled to apply signals MOUT00010 through MOUT15010 read out from memory modules 22-10 to their output terminals as signals MMIN00111 through MMIN15111 when signal ENABLE000 is forced to a binary ZERO by the circuits 21-2. The 16 data bits (signals MMIN00111-15111) are loaded into registers 28-10 and 28-12 when the CPU port control section 24-1 forces load signal LOADCP010 positive. The data bits are latched in the registers when load signal LOADCP010 is reset to a binary ZERO (i.e., negative going transition). The data contents of registers 28-10 and 28-12 are applied to the lines CPBX00-15 of the external bus via the register output terminals as signals CPBX00010-15010 when CPU section 19-1 asynchronously forces signal ENDTBX100 to a binary ZERO.

The data out section 28-2 for I/O memory port includes registers 28-20 and 28-22. The 16 data bit signals (MMIN00012-15012) received from driver circuits 28-5 and 28-6 are loaded into registers 28-20 and 28-22 when the I/O port control section 24-2 forces load signal LOADI0010 positive. The data bit signals are latched into the registers when load signal LOADI0010 is reset to a binary ZERO. The data contents of registers 28-20 and 28-22 corresponding to signals MYD00000-MYD150010 are applied via data lines MYD000-MYD150 to the data lines of the system bus 14-1 via the register output terminals as signals MYD000010-150010 when the bus priority logic circuits of block 19-10 grants the memory system 20 access to system bus 14-1 causing bus memory signal MEMWIN000 to be forced to a binary ZERO.

DIAGNOSTIC DATA REGISTERS

FIG. 2e shows a pair of 8-bit D-type transparent latch registers 30-1 and 30-2 which facilitate diagnostic testing as explained herein. As shown, the input terminals of these registers couple to the data lines MYD00-15 which provide signals to the data lines of system bus 14-1. The output terminals of the registers connect to the CPU external bus lines CPBX00-15. Both registers are enabled for storing data word signals being transferred to the data lines of system bus 14-1. Enabling is accomplished by connecting a gate (G) input terminal of each register to a positive voltage +V. The data contents of the registers are applied to the CPU external bus when bypass signal BYPASS000 is forced by section 19-1 to a binary ZERO.

DESCRIPTION OF OPERATION

Figure 3:
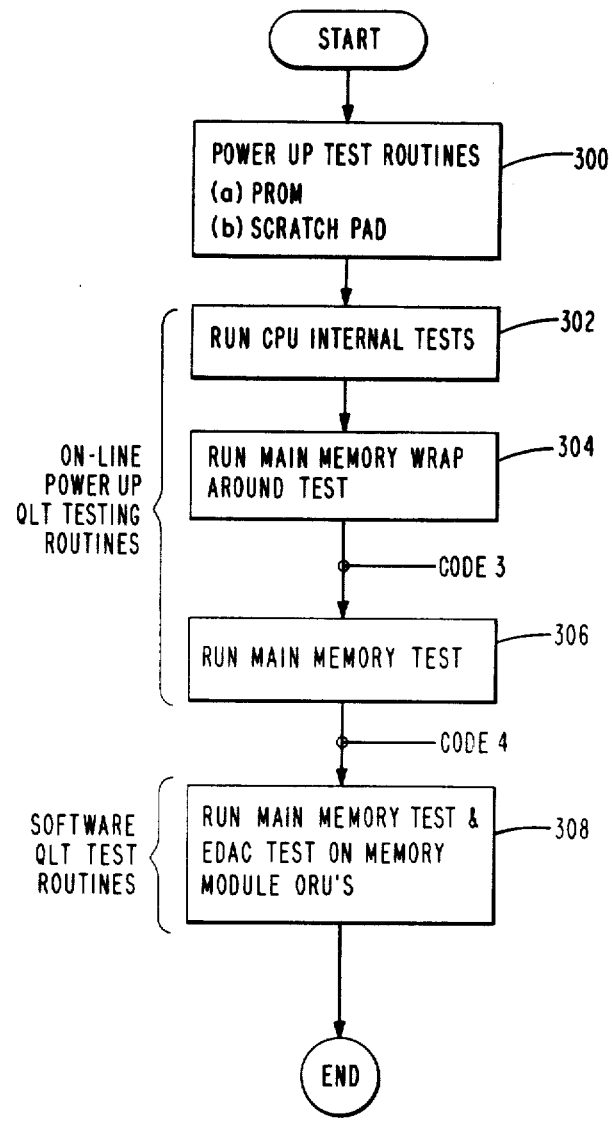
FIG. 3 is a flow diagram used in explaining the operation of the present invention.

With reference to FIGS. 1 through 2e and the flow diagram of FIG. 3, the operation of diagnostic apparatus of the present invention in performing diagnostic testing of the data processing system under microprogram control. Before discussing such diagnostic testing, the manner in which the system of FIG. 1 processes read and write commands will be briefly described.

It will be assumed that CPU 19-3 has specified a memory write operation wherein a complete 16-bit data word is to be written into the location specified by the memory address of the command loaded into the CPU memory port control and address sections 24-1 and 23-1, respectively. CPU 19-3 under microprogram control generates a memory write command by applying an appropriate combination of signals to its address/data bus which are loaded into control register 19-100 of FIG. 2b. This results in AND gate 19-122 forcing request signal CPOREQT10 to a binary ONE.

Assuming that the write command specifies a non-byte write operation, the register 19-100 is loaded with values which force signals CNTL00110 (memory write) and CNTL00210 (byte) to a binary ONE and a binary ZERO, respectively.

During the time clocking signal PHASEA000 is a binary ZERO, AND gate 19-5 places signal L6DTIN010 in a binary ZERO state which enables the memory address applied to the address/data bus by CPU 19-3 to be transferred via transceiver circuits 19-6 and 19-7 and driver circuits 19-8 to CPU external bus lines CPBX00-15 and CPBX00D-00A. Additionally, CPU 19-3 also forces memory reference signal MEMREF000 to a binary ONE. This enables register 24-10 of control section 24-1 of FIG. 2d to be loaded with the signals CNTL00110 through CPBX00A10 received from CPU section 19-1. Also, signal MEMREF000 enables registers 23-10 and 23-12 to be loaded with the row and column memory addresses applied via the CPU external bus.

Additionally, since this is a write command, CPU 19-3 causes NOR gate 19-104 of FIG. 2b to force write enable decode signal WRITEO110 to a binary ONE. Signal WRITEO110 together with signals CNTL01100 and CLKPT3000 enable decoder 19-112 to decode an all ZERO pattern applied to its input data terminals by register 19-100. This results in load data signal LDDATA000 being switched from a binary ONE to a binary ZERO. At that time, CPU 19-3 applies the data word to be written into memory to its address/data bus lines. During the next cycle, when load data signal LDDATA000 switches from a ZERO to a ONE, this causes the data signals CPBX00010-15010 to be latched into registers 26-10 and 26-12 of data in section 26-1 of FIG. 2e.

In response to the CPU request, the priority circuits 21-1 operate to begin a priority resolution cycle of operation. Early in the cycle, the circuits 21-1 of FIG. 2c force memory cycle signal MCYCLE010 to a binary ONE signalling the start of the memory cycle. At that time, the priority circuits 21-1 operate to switch the busy signal MCOBUSY10 to a binary ONE. Signal MCOBUSY10 indicates that the memory is in the process of performing the requested operation. As discussed in the related copending application "Priority Resolver with Lowest Priority Level Having Shortest Logic Path", the early signalling of the start of a memory cycle allows the memory system 20 to begin a memory cycle even before the requestor which is ultimately granted priority is determined.

As seen from FIG. 2c, signal MCYCLE010 causes the delay line timing generator circuits 21-4 to generate a sequence of timing signals for performing the memory cycle of operation. The priority circuits 21-1 operate to force CPU signal CPOGRNT10 to a binary ONE in response to the request. It is assumed that there is no refresh request and therefore signal RFGRNT010 remains a binary ZERO.

The combination of grant signals from circuits 21-1 cause only NAND gate 24-12 of section 24-1 of FIG. 2d to force control signal CPOCNTL00 to a binary ZERO. This causes control register 24-10 to apply its control and address contents to its output terminals. This in turn enables the decoding of the module/row address signals and the conditioning of the byte control circuits of FIG. 2d associated with the CPU port.

At the start of the memory cycle, the negative going timing pulse signal DLY020000 conditions AND gate 21-20 to generate row address strobe signal MRASTS010 for a period of approximately 250 nanoseconds. This signal enables the row address portion of the memory command to be strobed into the selected module or row of chips of memory modules 22-10. Also, since at the beginning of the memory cycle, signal DLY060000 is a binary ONE, inverter circuit 21-26 forces row address time signal RASTME010 to a binary ONE.

Signal RASTME010 partially conditions NAND gates 21-31 and 21-37 within the CPU and I/O port sections of FIG. 2c. The different combinations of grant signals establish the complete conditioning of one of these gates as specified by priority circuits 21-1. In this case, NAND gate 21-31 is conditioned by signals CPOGRNT10 and IOOGRNT00 to force signal MRASCP000 to a binary ZERO. This causes the row address contents of address register 23-10 of address section 23-1 to be applied via the memory address bus to the selected module/row of chips of memory modules 22-10 whereupon they are strobed into the chips by signal MRASTS010.

Next, the timing circuits 21-2 operate to generate negative going timing DLY060000 which causes AND gate 21-24 to force column address signal CASTME010 to a binary ONE. Signal CASTME010 partially conditions NAND gates 21-30 and 21-36 within the CPU and I/O port sections. NAND gate 21-30 is fully enabled by grant signals CPOGRNT10 and IOOGRNT00 to force signal MCASCP000 to a binary ZERO.

Also, signal MCASCP000 causes the column address contents of address register 23-12 of address section 23-1 to be applied via the memory address bus to the selected row of chips of memory modules 22-10. The column address is latched in the chips in response to column address strobe signal MCASTS010 being generated. This occurs when the generator 21-4 generates negative going pulse signal DLY100000 which causes AND gate 21-22 to force signal MCASTS010 positive. Signal MCASTS010 is generated approximately 100 nanoseconds after the start of a memory cycle or after the start of signal MRASTS010 for a period of approximately 220 nanoseconds.

Since the CPU request specifies a write operation, NOR gate 24-112 of FIG. 2d forces signal WORDWT010 to a binary ONE while partial write signal CYCTW0000 remains a binary ONE. This forces byte write signals WTBYT0010 and WTBYT1010 to binary ZEROS.

The combination of grant signals cause AND gate 24-120 to force CPU control signal CPOCNTL10 to a binary ONE. Accordingly, the top AND gate of gates 24-101 and 24-102 are fully enabled by signals WORDWT010 and CPOCNTL10. This causes signals CPOBYT000 and CPOBYT100 to switch to binary ZEROS. As seen from FIG. 2e, signals CPOBYT000 and CPOBYT100 condition registers 26-10 and 26-12 to apply their data contents to memory the data in bus.

When signal MCASCP000 switches to binary ZERO, it enables the priority circuits reset the CPU port 1 ask flip-flop. This permits the CPU port 1 which was granted priority to initiate another request upon the completion of the memory write operation.

During the memory cycle, timing generator circuit 21-4 operates to generate negative going timing pulse signal DLY220000. This in turn causes NAND gate 21-42 to force signal STDVAL000 to a binary ZERO. This causes the priority circuits 21-1 to reset the CPU grant flip-flop during non-byte write memory cycles of operation. As soon as the CPU grant flip-flop resets, the priority circuits 22-1 operate to force CPU port memory busy signal MCOBUSY10 to a binary ZERO. This indicates to the CPU 19-3 that memory system 20 has completed the write request. At this time, the priority circuits 21-1 are able to start another priority resolution cycle.

The memory system 20 processes a CPU memory read command in a similar fashion. Briefly, CPU 19-3 again forces memory reference signal MEMREF000 positive which loads the control and address signals of its memory read request/command into the control and address registers 24-10, 23-10 and 23-12 of sections 24-1 and 23-1. At the start of the memory read cycle of operation, the negative going timing pulse signal DLY020000 conditions AND gate 21-20 to generate row address strobe signal MRASTS010 for a period of approximately 250 nanoseconds. This signal enables the row address portion of the CPU memory write command to be strobed into the selected module or row of chips of memory modules 22-10. Also, since at the beginning of the memory cycle, signal DLY060000 is a binary ONE, inverter circuit 21-26 forces row address time signal RASTME010 to a binary ONE.

Signal RASTME010 partially conditions NAND gates 21-31 and 21-37 within the CPU and I/O port sections of FIG. 2c. The different combinations of grant signals establish the complete conditioning of one of these gates as specified by priority circuits 21-1. In this case, NAND gate 21-31 is conditioned by signals CPOGRNT10, RFGRNT100 and IOOGRNT00 to force signal MRASCP000 to a binary ZERO. This causes the row address contents of address register 23-10 of address section 23-1 to be applied to the selected module/row of chips of memory modules 22-10 via the memory address bus whereupon they are strobed into the chips by signal MRASTS010.

Next, the timing circuits 21-2 operate to generate negative going timing DLY060000 which causes AND gate 21-24 to force column address timing signal CASTME010 to a binary ONE. Signal CASTME010 partially conditions NAND gates 21-30 and 21-36 within the CPU and I/O port sections. NAND gate 21-30 is fully enabled by grant signals CPOGRNT10 through IOOGRNT00 which forces signal MCASCP000 to a binary ZERO.

Signal MCASCP000 causes the column address contents of address register 23-12 of address section 23-1 to be applied to the selected row of chips of memory modules 22-10 via the memory address bus. The column address is latched in the chips in response to column address strobe signal MCASTS010 being generated. This occurs when the generator 21-4 generates negative going pulse signal DLY100000 which causes AND gate 21-22 to force signal MCASTS010 positive.

During this memory cycle, the combination of grant signals from circuits 21-1 cause only NAND gate 24-12 of section 24-1 of FIG. 2d to force control signal CPOCNTL00 to a binary ZERO. This causes control register 24-10 to apply its control and address contents to its output terminals. This, in turn, enables the decoding of the module/row address signals and the conditioning of the byte control circuits of FIG. 2c associated with CPU port 1. That is, since the CPU request specifies a read operation, NOR gate 24-112 forces signal WORDWT010 to a binary ZERO while partial write signal CYCTW0000 remains a binary ONE. This forces byte write signals WTBYT0010 and WTBYT1010 to binary ZEROS.

The combination of grant signals cause AND gate 24-120 to force CPU control signal CPOCNTL10 to a binary ONE. Accordingly, the top AND gate of gates 24-101 and 24-102 are only partially enabled by signals WORDWT010 and CPOCNTL10. This causes signals CPOBYT000 and CPOBYT100 to remain binary ONES.

During the read cycle of operation, the memory modules 22-10 read out a 16-bit word from the location of the selected row of chips specified by the memory row and column addresses. The 16-bit data word is applied to the driver circuits 28-5 and 28-6 of FIG. 2e. When the timing generator circuits force signal ENABLE000 to a binary ZERO in response to negative going timing signals DLY080000 and DLY200000, the driver circuits 28-5 and 28-6 operate to apply the data word to the data out sections 28-1 and 28-2.

Additionally, since this is a read command, CPU 19-1 causes NOR gate 19-106 of FIG. 2b to force read enable decode signal READEN010 to a binary ONE. Signal READEN010 together with signals CTL021000 and PHASE010 enable decoder 19-114 to decode an all ZERO pattern applied to its input data terminals by register 19-100 which was previously loaded with an appropriate value by CPU 19-3. At that time, signal ENDTBX100 is switched from a binary ONE to a binary ZERO. Signal ENDTBX100 enables the data out registers 28-10 and 28-12 of section 28-1 of FIG. 2e to apply their data word contents (i.e., signals CPBX00010-15010) read from memory modules 22-10 to external bus lines CPBX00-15.

As seen from FIG. 2d, since control section 24-1 of CPU port 1 specifies a read, signal MMWRIT010 is a binary ZERO. This, in turn, forces the J input terminal of each of the load flip-flops 24-14 and 24-24 of sections 24-1 and 24-2 to be a binary ONE. Thus, when timing signal MCASCP000 is forced to a binary ZERO, this causes CPU load flip-flop 24-14 to switch to a binary ONE forcing signal LOADCP010 to a binary ONE and signal LOADCP000 to a binary ZERO. When a binary ONE, signal LOADCP010 enables the CPU data out registers of section 28-1 to be loaded with memory data.

When signal MCASCP000 switches to a binary ZERO, it enables the priority circuits 21-1 to reset the CPU port ask flip-flop. This permits CPU port which was granted priority to initiate another request upon the completion of the memory read operation.

During the read memory cycle, data valid flip-flop 21-48 of FIG. 2c is set as a function of error signal SOMERR000 from EDAC chip 28-8 in response to the negative going timing pulse DLY280000. When there is no error indicating that the data word read out from memory is correct, signal SOMERR000 switches the data valid flip-flop 21-48 to a binary ONE. This, in turn, resets the CPU load flip-flop 24-4 to a binary ZERO forcing signal LOADCP010 to a binary ZERO. When being switched to a ZERO, the memory data word is latched into the output registers 28-10 and 28-12. When a single or double bit error is detected, signal SOMERR000 causes data valid flip-flop 21-48 to remain at a binary ZERO. When negative going timing pulse signal DLY120000 switches positive (420 nanoseconds after the start of the cycle) following the generation of negative going timing pulse DLY220000, NAND gate 21-42 of FIG. 2c operates to force signal STDVAL000 to a binary ZERO. This switches data valid flip-flop 21-48 to a binary ONE which resets the CPU load flip-flop 24-14. At that time, the corrected data word (i.e., single bit error) or uncorrected data word (i.e., multiple error) is latched into the data out registers.

SYSTEM DIAGNOSTIC MODE OPERATION

The apparatus of the present invention when included within the address and data paths as described above permits CPU 19-3 to diagnose which optimum replaceable unit (ORU) of the system of FIG. 1 has failed, in addition to which port of such ORU has failed. The diagnosis is accomplished under microprogram control as part of the power up procedure. Thus, no new software or additional hardware need be added to the system.

For the purpose of the present invention, the power up procedure during which quality logic tests are performed is carried out in a conventional manner. That is, referring to FIG. 3, the system performs a series of test routines which check the various portions of CPU section 19-1. As indicated by block 300, these include a programmable read only memory (PROM) test which verifies the PROM 19-4 as being operational and scratchpad test which tests the addressing capability of the CPU scratchpad. Next, a series of CPU internal tests of block 302 are performed for verifying the various address and data paths within CPU 19-3. Tests of this type are described in U.S. Pat. Nos. 4,048,481 and 4,159,534. After having completed the tests of block 302, the CPU section 19-1 has been verified as operational. Next, the diagnostic mode control circuits are set to perform the memory wrap around test of block 304. This test proceeds as follows.

QLT MEMORY WRAP TEST

1. Set up constant.
2. Turn on data memory, wrap control and generate constant value of 5555.
3. Generate final constant value of 55555.
4. Set control indicator denoting pass and load mask.
5. Load address into memory address registers.
6. Output the data to memory data in registers.
7. Load data back into CPU from data out registers.
8. Check data.
9. Test if data check as being correct. If not correct, signal failure. If correct, go to next step.
10. Test memory address register value.
11. Mask 8 bits for checking the column address.
12. Check result of test. If not correct, signal failure. If correct, go to next step. Transfer bit address from diagnostic status register.
13. Shift module address bits into proper position for testing.
14. Load module address bits into instruction register.
15. Check the module address bits and complement the address value stored in address location (i.e., AAAAA for second phase of test). If correct, go to next step. If not correct, signal error.
16. Reset control indicator and test, if done. If done, go to next step. If not done, return to step 5.
17. Turn off data memory wrap control.

As indicated in step 1, CPU 19-3 sets up an address constant under microprogram (firmware) control. In response to a first microinstruction word, it transfers the value "4000" derived from a microinstruction word and writes it into register DW5 of the CPU register file. In response to a second microinstruction word, CPU 19-3 transfers the value 00055 into the CPU's G register via the internal bus. At the same time, it swaps and transfers the value "05500" from the internal bus and writes it into register AW1.

In step 2, CPU 19-3 places the system in the data memory wrap mode and generates the constant "5555". That is, in response to a third microinstruction word, CPU 19-3 takes the value "05500" stored in register AW1 and the value "00055" stored in the G register and adds them together in the ALU. The resulting value "05555" in transferred via the ALU and written into register AW1.

Also, during step 2, the third microinstruction word which is coded to specify the memory wrap operation causes register 19-100 of FIG. 2b to address bit location 4 of register 19-116 and conditions register 19-116 so that a binary ZERO value is written into the bit location (i.e., signal CNFLB1010=0). By presetting the binary ZERO value into bit location 4 of register 19-116, memory loop signal MEMLOP000 will be forced to a binary ZERO (low) when the bit location is addressed during testing. As explained herein, signal MEMLOP000 allows the data which is being written into memory during a memory write operation to be also latched into the CPU data out registers.

In step 3, the CPU 19-3 generates the final value 55555 which will be used as both address and data during testing. The value 55555 provides a first pattern of alternate ONES and ZEROS (i.e., 0101, 0101, etc.). When the value is complemented during the second phase of the test, it becomes "AAAAA" thereby providing a second pattern of alternate ONES and ZEROS (i.e., 1010, 1010, etc.). Both patterns verify that the system registers, etc. can be set and reset and therefore are operational.

In greater detail, in step 3, in response to a fourth microinstruction word, the CPU 19-3 transfers the contents of register AW1 to the ALU. It then writes into the high order bit positions of register AW1 the constant value 5 applied via the internal bus together with the previous value. The result is that register AW1 now stores the value 55555. Next, CPU 19-3, in response to a fifth microinstruction word, generates the constant value 00FF onto the internal bus, which it writes into register file register DW1. This constant is used for masking off the bits which are to be examined. At the same time, it forces one of the control indicator flip-flops to a binary ONE. The state of the flip-flop indicates which phase of the test is being performed (i.e., first or second pass). This completes step 4.

In step 5, under the control of a sixth microinstruction word, CPU 19-3 writes the address value 55555 into the address registers of section 23-1. That is, CPU 19-3 issues a memory write in which it forces memory reference signal MEMREF000 and request signal CPOREQT10 to binary ONES. Also, the signals CNTL00010 and CNTL02010 are forced to states for specifying a write non-byte operation. At the same time, the value 55555 to be read out from register AW1 and applied via the internal bus to the address/data bus lines.

In the manner previously described, the module address value together with the write control signals, are loaded into control address register 24-10 of FIG. 2d. The row and column addresses are loaded into address registers 23-10 and 23-12 of FIG. 2a.

The sixth microinstruction word also causes bit location 5 of register 19-116 of FIG. 2b to be preset to a binary ZERO. That is, signals CNFLD2010-0010 address bit location 5 at which time a binary ZERO value of signal CNFLB1010 is written therein. As discussed herein, this allows the diagnostic status register 23-114 of FIG. 2a to retain those signals which correspond to the module address transferred by CPU 19-3 and stored in section 24-1. That is, when the hold diagnostic register signal HOLDDG000 is forced from a binary ONE to a binary ZERO, it causes AND gate 23-122 of FIG. 2a to force hold signal DIAGLH010 to a binary ZERO which latches the module address in register 23-114.

Also, during step 5, the microinstruction word disables the CPU interrupt hardware circuits so that it will not branch off to another location caused by some error indication during testing.

In step 6, CPU 19-3 places the "55555" value as data on the address/data bus. That is, in response to a seventh microinstruction word, the CPU 19-3 addresses AW1 register file register and the 55555 value is applied via the internal bus to the address/data bus. Again, the CPU interrupt hardware circuits are disabled. Also, the error indicators are cleared, since the address value could represent a non-existent memory address causing an error resulting in a CPU branch. The seventh microinstruction word contents of register 19-100 enables decoder circuit 19-112 of FIG. 2b and causes it to force load data signal LDDATA000 from a binary ONE to a binary ZERO. This enables the 5555 value to be latched into the section 26-1 data registers. During the next microinstruction cycle, when signal LDDATA000 switches from a binary ZERO to a binary ONE.

Additionally, because of having been set to a binary ZERO in step 1, memory loop address signal MEMLOP000 is a binary ZERO. This enables load CPU flip-flop 24-14 of FIG. 2e to switch to a binary ONE. This permits the input data register contents being applied to the memory data in bus to be latched into the CPU output data registers of section 28.

In response to the CPU request, the timing generator circuits 21-2 generate the same sequence of timing signals for carrying out the memory write operation as previously described. When signal MRASCP000 is forced to a binary ZERO, the address register 23-10 applies its row address contents to the memory address bus. Thereafter, signal MCASCP000 is forced to a binary ZERO.

As seen from FIG. 2a, this causes address register 23-12 to apply its column address contents to the memory address bus. At the same time, signal CASTME010 causes signals MADD00010-06010 representative of the column address to be latched into diagnostic address register 23-100.

During the memory write cycle, signal CPOCNTL00 is forced to a binary ZERO which applies the address and control signal contents of register 24-10 of FIG. 2d as outputs. The signals MMAD03010-06010 of FIG. 2d, corresponding to the module address, are latched into diagnostic status register 23-114 during step 5. Additionally, signal MMWRIT010 partially conditions NAND gate 24-16. However, during step 6, signal MEMLOP000 is a binary ZERO which forces signal MMWRIT101 to a binary ONE. Therefore, when signal MCASCP000 is forced to a binary ZERO, CPU load flip-flop 24-14 switches to a binary ONE. The result is that signal LOADCP000 is forced to a binary ZERO. In the manner previously described, the circuits of block 24-100 of FIG. 2d operate to force CPU byte signals CPOBYT000 and CPOBYT100 to binary ZEROS. This causes the data-in registers 26-10 and 26-12 of FIG. 2e to be applied to the memory data-in bus as signals MMIN00010-1510. At the same time, signal LOADCP010 causes the same signals MMIN00010-15010 to be latched into the data out registers 28-10 and 28-12.

During step 7, CPU 19-3 transfers the data contents of registers 28-10 and 28-12 back for checking. That is, the eighth microinstruction word loaded into register 19-100 enables decoder circuit 19-114 by forcing signal READEN010 to a binary ONE. This causes decoder circuit 19-114 to force signal ENDTBX100 to a binary ZERO. As seen from FIG. 2e, signal ENDTBX100 causes the data contents of registers 28-10 and 28-12 to be applied to the CPU external bus lines CPBX00-15. At that time, AND gate 19-5 forces directional signal L6DTIN010 to a binary ONE which, in turn, transfers the data signals to the address/data lines via transceiver circuits 19-6 and 19-7. From there, the data signals are applied to the internal bus and stored in the Q register. The Q register contents are applied to the B port of the ALU. Also, a return address equal to the address of the current microinstruction word +1 is loaded into the push stack array circuits.

During step 8, the data value is checked. In greater detail, under the control of the ninth microinstruction word loaded into register 19-100, CPU 19-3 addresses and reads out the contents of register AW1, which is applied to the A port of the ALU. During a first pass, the ALU is conditioned to subtract the "55555" value contents of register AW1 from the 16-bit data contents of the Q register. During a second pass, AW1 stores the value AAAAA. If the value is of the 16 low order bits equals zero, then a specified one of the temporary storage indicator flip-flops is set to a binary ONE. Also, microinstruction word contents of register 19-100 causes signals CNFLD2010 through CNFLD0010 to address bit location 5 of register 19-116 which again forces signal HOLDDG000 to a binary ZERO which is the value of CNFLB1010. This continues to hold the module address within diagnostic register 23-114 (i.e., prevents any change in state caused by changes in input signals).

In step 9, CPU 19-3 tests to see whether the data signals which were passed through the data path were identical to the original 5555 value. In greater detail, the tenth microinstruction word loaded into register 19-100 causes CPU 19-3 to execute a two-way branch operation based upon the state of the temporary zero indicator flip-flop. If the flip-flop was set to zero, indicative of a non-comparison, CPU 19-3 branches to a test routine which signals the main computer board as the failing ORU. If the flip-flop was set to a ONE indicative of an identical comparison, CPU 19-3 continues testing by addressing the microinstruction word specified by the return address value stored in step 7.

Also, microinstruction word contents of register 19-100 enable decoder circuit 19-114, which causes signal DIGREG000 to be forced to a binary ZERO. This causes diagnostic address register 23-100 of FIG. 2a to apply its column address contents to external bus lines CPBX08-15. Again, signal READEN010 forces signal L6DTIN010 to a binary ONE enabling transceiver circuit 19-4 to apply the column address contents to the address/data lines. From there, the address is loaded into the Q register via the internal bus.

In step 10, CPU 19-3 tests the column address value stored in the Q register. In response to an eleventh microinstruction word, the interrupt hardware circuits are disabled and the error circuits are cleared. Then in response to a twelfth microinstruction word, CPU 19-3 addresses register AW1 and applies its contents to the A port of the ALU whose B port is connected to receive the contents of the Q register. The microinstruction word conditions the ALU to subtract the column address value from the AW1 register contents and load the ALU results into the Q register.

In the next step 11, in response to the thirteenth microinstruction word, CPU 19-3 masks off the eight bits whose results are to be examined by addressing register DW1 and applying its 00FF value to the A port of the ALU via the internal bus. At the same time, the results of the contents of the Q register are applied to the B port of the ALU. The microinstruction word conditions the ALU to perform a logical AND operation on both input operands. If the ALU 16-bit result is ZERO, this causes the temporary zero indicator flip-flop to be set to a binary ONE. Again, a return address equal to the address of the current microinstruction word is loaded into push stack array to return from during the two-way branch test of step 12.

During step 12, in response to the fourteenth microinstruction word, CPU 19-3 tests the result in step 11 by executing a second two-way branch operation, based upon the state of the temporary zero indicator flip-flop. If the flip-flop is set to a binary ZERO, then CPU 19-3 branches to the above mentioned test routine which signals the main computer board as the failed ORU. If the flip-flop is set to a binary ONE, the CPU 19-3 continues testing by addressing the microinstruction word specified by the return address value stored in step 11. The microinstruction word contents of register 19-100 again forces signal READEN010 to a binary ONE which enables decoder circuit 19-114 to force diagnostic mode register signal DIAGMD000 to a binary ZERO. As seen from FIG. 2b, this causes register 23-114 to apply the four module address bits to external bus lines CPBX12-15. At that time, the module address bits are applied to lines DABS12-15 of the address/data bus via enabled transceiver circuit 19-7. Additionally, the same microinstruction word causes the module address bits to be loaded into bit positions 12-15 of the Q register via the internal bus and to be written into the same bit positions of register DW2.

During step 13, CPU 19-3 under the control of a fifteenth microinstruction word, shifts the module address bits into proper position for testing. That is, CPU 19-3 addresses register DW2 and applies its ZERO contents to the A port of the ALU while the module address contents of the Q register are applied to the B port. The ALU is conditioned to add the two input values together which returns the same value to the Q register. At the same time, CPU 19-3 performs a swap of the Q register bit contents applied to the internal bus via the ALU which places the four module address bits in the least significant 4-bit positions of register DW2 when written therein.

In the same step, CPU 19-3 in response to a sixteenth microinstruction word, addresses register DW2 and loads the value into the Q register. In the next step 14, CPU 19-3, in response to a seventeenth microinstruction word, addresses the AW1 register and applies the value 55555 to the A port of the ALU while the module address bit contents of the Q register are applied to the B port. The ALU is conditioned to subtract the module address bit contents from the AW1 contents and load the result into the F register. When the least significant bits 12-15 of the F register are ZEROS, this causes another temporary zero indicator flip-flop to be set to a binary ONE.

In the next step 15, CPU 19-3 in response to an eighteenth microinstruction word, performs a third two-way branch operation based upon the state of the zero indicator flip-flop. When the flip-flop is set to a binary ZERO, CPU 19-3 branches to the above mentioned test routine and signals the main computer board as the failed ORU. When the flip-flop is set to a ONE, CPU 19-3 continues testing by addressing the microinstruction word stored in the next location. During the same step, CPU 19-3 addresses register AW1 and transfers its 55555 contents to the A port of the ALU. It then conditions the ALU to complement the 55555 value which produces the result of AAAAA. The 20-bit value of all A's into register file register AW1. Also, CPU 19-3 loads a return address into the push stack array.

Next, in step 16, CPU 19-3, in response to the nineteenth microinstruction word, tests the state of the control indicator flag set in step 4 by performing a fourth two-way branch operation. If it is a ONE, CPU 19-3 continues testing by returning to step 5 via the return address. If it is a ZERO, CPU 19-3 goes to step 17. During step 17, in response to the twentieth microinstruction word stored in register 19-100, signals CNFLD2010 through CNFLD0010 address bit location 4 of register 19-116 of FIG. 2b. At that time, the binary ONE signal CNFLB1010 is written into the bit location. This returns the memory loop signal MEM-LOP000 to a binary ONE enabling the system to operate normally.

Since the address and data paths will have been verified relative to the value "55555", CPU 19-3 returns to step 5 and carries out the same testing using the value AAAAA. When the address and data paths are verified as operating properly, CPU 19-3 has completed its diagnostic testing. It then performs step 17 in which it resets this mode of operation and, as indicated in FIG. 3, continues on further testing of the memory modules by performing the test of block 306 which completes those initial tests which are conducted under microprogram control during power up.

If CPU 19-3 detects an error occurring during the test of block 306, it is now able to signal which optimum replaceable unit has failed. In such case, CPU 19-3 would identify the particular memory module under test as the failed ORU.

As seen from FIG. 3, at the successful conclusion of QLT testing, CPU 19-3 is able to perform additional testing of main memory under software tests.

The above has shown how with a minimum of additional hardware, it is possible to diagnose faults within the basic replaceable units of the system of FIG. 1. The same testing can be also employed to establish which part of the main computer board has failed. That is, the failure can be isolated to the specific memory port. More specifically, when the test of block 304 of FIG. 3 is carried out successfully, this verifies that a significant amount of the circuits within the memory system 20 are functioning properly. These circuits include the CPU priority circuits of block 21, the major portion of the timing generator circuits of block 21-2, the circuits of CPU control section 23-1, the column address register 23-12, the wire ORed memory address bus lines, the CPU data-in/data-out bus lines and section 26-1, wire ORed data-in/data-out bus lines and CPU data out section 28-1. Additionally, the operation of row address register 23-10 is also indirectly verified.

In many instances, it is also important to determine the operability of the I/O address and data paths as well. This can be accomplished utilizing the same type of test. However, instead of presetting a memory loop command as in step 2, CPU 19-3 under microprogram control causes signals CNFLD2010 through CNFLD0010 to address bit location ZERO of register 19-116 and force signal CNFLB1010 to a binary ZERO. By presetting bit location 0, this enables I/O loop signal IOLOOP000 to be forced to a binary ZERO which, in turn, enables the I/O load flip-flop 24-24 to be switched to a binary ONE state in response to a write memory command. Accordingly, the data originating from CPU 19-3 transferred and loaded into the I/O data in section registers 24-20 and 24-22 are also latched into the data out registers 28-20 and 28-22 as discussed herein. Thus, the I/O loop signal provides the same kind of control of the I/O data path as signal MEMLOP000 does in the CPU data path.

Another signal used during I/O testing is I/O hold signal IOHOLD010 from register 19-116. This signal is also applied to as an input to the I/O load flip-flop 24-24. Again, before step 7, CPU 19-3, under microprogram control, causes signals CNFLD2010 through CNFLD0010 to address bit location 6 of register 19-116 and force signal CNFLB1010 to a binary ONE. By presetting bit location 6, this enables I/O hold signal IOHOLD010 to be forced to a binary ZERO which in turn inhibits the I/O load flip-flop 24-24 from being switched to a binary ONE in response to a memory read command. As explained herein, this permits the data latched into the I/O data out registers to be preserved for checking.

In accordance with the teachings of the present invention, in order to minimize apparatus, the existing circuits and paths are used during I/O testing. More specifically, in order to issue an I/O write command, CPU 19-3 operates to generate a write command which it applies to the address, control and data lines of system bus 14-1. Also, it forces the bus control lines BSMEMREF, BSWRIT and BSBYTE of system bus 14-1 to the appropriate states. However, prior to generating the write command, CPU 19-3 presets bit position 0 of register 19-116 so as to specify the I/O test operation.

The module address, row and column addresses and applied to the address/data bus as before. However, the microinstruction word contents of register 19-100 cause decoder circuit 19-112 to force in succession load transfer I/O signal LDDTIO000 and I/O address load signal IOADLD000 to binary ZEROS. When each of these signals switch from a binary ZERO to a binary ONE, the positive transition clocks the module address and row and column addresses into registers 19-402, 19-404 and 19-406. Additionally, the CPU 19-3 generates a request to the bus control circuits of block 19-10 for accessing bus 14-1. When CPU 19-3 is granted access, the bus control circuits of block 19-10 force signal CPUWIN000 to a binary ZERO. This enables the row and column address contents of registers 19-404 and 19-406 of FIG. 2a to be applied to the address lines of bus 14-1.

The bus logic circuits of block 19-10, in response to the bus memory request from the BSMREF line, generate memory acknowledgement signal MEACKR710. The signal MEACKR710 enables the bus address signals applied to bus address lines BSAD07-15 to be loaded into I/O address registers 23-20 and 23-22 of FIG. 2a. Also, the signals applied to bus control lines BSWRIT and BSBYTE together with bus address signals BSAD23110-BSSD06110 are loaded into I/O control register 24-20 of FIG. 2d in response to signal MEACKR710.

In addition to the above, signal MEACKR710 causes I/O request signal IOREQT010 to be switched to a binary ONE. This causes the timing generator circuits of block 21-2 to generate the same sequence of timing signals described above for performing the memory write cycle of operation.

After transferring the memory address, CPU 19-3 applies the data value 55555/AAAAA to the address/data lines. The data value is then loaded into the CPU bus data out registers 19-201 and 19-202 of FIG. 2e when signal LDDTIO000 goes positive. When signal CPWWIN000 is forced to a binary ZERO by the bus logic circuits of block 19-10, the data contents of registers 19-201 and 19-202 are applied to the data lines of bus 14-1. When signal MEACKR710 is switched positive, it causes the data value applied to the bus data lines to be loaded into I/O data input registers 26-20 and 26-22 of FIG. 2e.

From this point on, the timing generator circuits of block 21-2 and priority circuits of block 21-1 provide signals which condition the I/O address registers 23-20 and 23-22 of FIG. 2a to apply the row and column addresses to the memory address bus. The column address is also stored in diagnostic address register 23-100 while the module address is stored in diagnostic status register 23-114. That is, the contents of I/O control register 24-20 of FIG. 2d are applied as outputs whereafter the module address signals MMAD03010-06010 are latched into register 23-114 in the manner previously described.

Additionally, I/O loop signal IOLOOP000 is forced to a binary ZERO which causes NAND gate 24-26 to force signal MMWRIT103 to a binary ONE. This causes I/O load flip-flop 24-24 to be switched to a binary ONE in response to timing signal MCASI0000. This forces signal LOADI0010 to a binary ONE. Also, the byte write control circuits of block 24-100 operate to force signals IOOBYT000 and IOOBYT100 to binary ZEROS. This causes the data contents of I/O data in registers 26-20 and 26-22 to be applied to the memory data bus. At the same time, when I/O load signal LOADIO010 goes positive, it latches the data signals applied to the memory data bus into the I/O data out registers 28-20 and 28-22.

At this point, the transfer of address and data through the I/O address and data paths is completed. Now, the CPU 19-3 has to transfer the stored address and data values for checking and verification. The most expeditious way of accomplishing this is by utilizing the pair of diagnostic data registers 30-1 and 30-2 of FIG. 2e. Under microprogram control CPU 19-3 operates to force bus logic signal MEMWIN000 to a binary ZERO. This causes I/O data out registers 28-20 and 28-22 to apply their data contents to lines MED000-015. At that time, the data contents are also loaded into registers 30-1 and 30-2. Now, CPU 19-3 under microprogram control can cause decoder circuit 19-114 to a binary ZERO. This applies the data contents of diagnostic data registers 30-1 and 30-2 to the external bus for transfer to CPU 19-3. Thus, these registers are operated and controlled similar to the CPU data out registers 28-10 and 28-12.

If it is desirable to eliminate registers 30-1 and 30-2, then CPU 19-3 will be required to issue a memory read command after the above described memory write command. The read command memory address and control signals are applied to the address and control lines of system bus 14-1 in the manner described above. However, prior to issuing the memory read command, CPU 19-3 operates to preset bit location 6 of register 19-116 to a binary ONE. This inhibits I/O load flip-flop 24-24 from being switched to a binary ONE in response to clocking signal MCASI0000 which would normally occur. Thus, the I/O data out registers retain their original contents.

Additionally, CPU 19-3 places its channel number on the data lines of the system bus. That is, CPU 19-3 loads bus data out registers 19-201 and 19-202 with an all ZERO value. This identifies CPU 19-3 as the source of the memory read command. In response to the memory read command, the bus logic circuits of block 19-10 force signal MEACKR710 positive. This causes the CPU channel number to be stored in I/O address registers 19-410 and 19-412 of FIG. 2a.

On the second half of the bus cycle, which is the interval during which the memory system 20 transfers the data read from memory, the CPU channel number is applied to the address lines of system bus 14-1. That is, when the bus logic circuits of block 19-10 force signal MEMWIN000 to a binary ZERO, the registers 19-410 and 19-412 apply the CPU channel number to the address bus lines. The gates 19-132 and 19-134 of FIG. 2b operate to force signal CPSHCS410 to a binary ONE enabling the switching of flip-flop 19-130 to a binary ONE. This, in turn, forces signal CPSHRC010 to a binary ONE which causes the bus data-in registers 19-204 and 19-206 to store the data contents of I/O data out registers 28-20 and 28-22 applied to the data lines of system bus 14-1 in response to signal MEMWIN000. From there, CPU 19-3 under microprogram control causes decoder circuit 19-114 to force signal ENIOBX000 to a binary ZERO. This is done in lieu of forcing signal ENDTBX100 to a binary ZERO.

Checking and testing of the address and data values proceeds in the same manner as described above. In the event of any detected non-comparison, CPU 19-3 is able to identify the I/O port address or data path as the failed part of the main computer board. Where the diagnostic data registers 30-1 and 30-2 have been included, CPU 19-3 can eliminate the circuits associated with system bus 14-1 as the source of failure. That is, testing is carried out without the step of having to issue a bus memory read command. Next, CPU 19-3 can issue the read command and compare the two sets of results and from there determine whether or not the system bus was the source of failure.

The above examples have illustrated how the present invention accomplishes testing of the address and data paths of the system of FIG. 1 with the inclusion of a minimum amount of additional circuits. By introducing certain modifications in the normal operation of the system, it is possible to store address and data values at predetermined points within the system. These points correspond to the places where the address and data paths are wired ORed together. This permits failures to be isolated down to the optimum replaceable unit. Additionally, the invention permits testing to proceed without the memory modules being included within the system. This type of testing is carried out in a factory environment. However, it proceeds in the manner described above with the exception that numerous different address and data patterns are utilized instead of just the pair of complementary address and data patterns of 5's and A's. Additionally, other patterns of A's and 5's may be employed. These patterns are selected to have complementing adjacent signals in order to detect when adjacent signal lines are shorted together.

The number of ports may be reduced or expanded. For further examples of expansion, reference may be made to the copending patent application entitled "Asynchronous Multiport Parallel Access Memory System for Use in a Single Board Computer System". Also, the number of ports may be reduced to having a single CPU memory port. Also, it will be appreciated that such testing could also be carried out by a unit other than the CPU, such as a separate support processor or by a unit which couples to an I/O memory port, or by diagnostic equipment connectable during factory testing. Further, the organization of ORUs may be altered. For example, the sections of I/O memory ports may be made as part of a separate ORU. The apparatus of the present invention would be able to identify when this ORU is faulty in the same manner as it identifies faults occurring within the I/O port when part of the single computer board. Also, other address and data registers may be added within the system to provide additional fault isolation as concerns the system bus address and data sections which are used to introduce test address and data into the I/O memory port during the testing thereof.

To prevent undue burdening the description with matter within the ken of those skilled in the art, a block diagram approach has been followed with a detailed functional description of each block and specific identification of the circuits represented (e.g. chip type). The individual engineer is free to select elements and components such as flip-flop circuits, registers, gates, etc. from the individual's own background or available standard references (e.g. Texas Instruments Corporation catalogues).

It will be noted that the formats and coding of the microinstructions were not disclosed herein since the engineer is free to select alternate forms of coding. For further details and insight into techniques for deriving such coding and for additional background, reference may be made to the text titled "Computer Design Fundamentals" by Y. Chu, McGraw-Hill Book Company, Inc., Copyright 1962, text titled "Computer Organization and Microprogramming" by Y. Chu, Prentice-Hall Inc., Copyright 1972 and the text titled "Microprogramming Principles and Practice" by S. S. Husson, Prentice-Hall Inc., Copyright 1970.

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. A data processing system including a processing unit for generating memory read and write requests, each request coded to specify the type of memory operation, an address specifying where in memory data is being accessed from or written into, in addition to any data to be written therein and a main memory system having a number of memory modules, said data processing system being subdivided into a number of optimum replaceable units (ORUs) wherein each of said memory modules is a separate ORU, another one of said ORU's including a number of memory ports included in said main memory system for receiving said memory requests, each memory port including a plurality of sections, said sections including an address section, an input data section and output data section for storing said request address and data for transfer to said memory module ORUs and for storing receiving data read out from said memory module ORUs when said port is granted access to said memory system, the outputs of each of said address sections being connected in common to one end of a memory address bus whose other end connects in common to each memory module ORU and the output of each of said input data sections and the input of each of said output data sections being connected in common to one end of a memory input/output data bus whose other end connects in common to said each memory module ORU, said another ORU further including apparatus for enabling errors to be isolated to a faulty one of said ORUs during testing, said apparatus comprising:

address register means coupled to said address bus and to said processing unit, said address register means being connected to receive and store address signals representative of each section port address transferred to said address bus during memory read and write operations; and, control means coupled to said processing unit, to said address register means, to said input data sections and to said output data sections of said memory ports, said control means being operative during said testing to selectively condition said address register means to transfer address signals to said processing unit and for selectively conditioning said output data sections for storing and transferring to said processing unit data signals representative of said input memory data being transferred to said memory data bus by corresponding ones of said input data sections for enabling said processing unit to isolate faults within said memory system to a faulty ORU memory module of memory port.

2. The system of claim 1 wherein said control means includes:
an input register for storing microinstructions transferred by said processing unit and decode and register control circuit means coupled to said input register, said decode and register control circuit means being operative in response to said microinstructions to generate signals during said testing required for enabling said processing unit to isolate said faults.

3. The system of claim 2 wherein said decode and register control circuit means includes addressable register means coupled to said input register and to different ones of said plurality of sections of said memory ports, said addressable register means including a plurality of bit locations which a preset to predetermined states in response to said microinstructions for conditioning said different ones of said plurality of sections during said testing to alter normal operation for enabling said processing unit to isolate said faults.

4. The system of claim 2 wherein said decode and register control circuit means couples to said processing unit, to said address register means, said address sections, said input data sections and to said output data sections, said decode and register control circuit means being operative during said testing to generate signals for enabling the transfer of a predetermined test address and data values to the inputs of said memory port address and input data sections for subsequent transfer to said memory module ORUs from said address and data buses by each of said memory ports upon being granted access to memory and storage in said address means and a corresponding one of said output data sections, for enabling said processing unit to verify that said each memory port sections can process requests through respective address and data paths including said address and data buses.

5. The system of claim 4 wherein said processing unit includes comparison means for comparing said predetermined test address and data values with the test address and data values transferred to said processing unit from said address register means and said corresponding one of said output data sections in response to signals generated by said decode and register control circuit means for verifying said address and data paths.

6. The system of claim 4 wherein said predetermined test values are the same, said decode and register control circuit means being operative during said testing to generate a first sequence of signals for enabling said transfer of a first set of like test address and data values to said address and data buses and a second sequence of signals for enabling the transfer of a second set of like test address data values to said address and data buses.

7. The system of claim 6 wherein said first and second sets of test address and data values applied to said address and data buses are coded to be complementary.

8. The system of claim 7 wherein each of said address and data buses consists of a number of lines, each of said test address values and test data values consisting of patterns of alternating 1's and 0's to enable the detection of when any adjacent lines of said address and data buses are shorted together.

9. The system of claim 7 wherein one of said sets of test address and data values are all 5's and the other ones of said sets of test address and data values are all A's.

10. The system of claim 6 wherein each of said memory modules ORUs is included on a separate board removable from said memory system, said board further including a memory connector which connects to said address and data buses when said memory module ORU is installed in said memory system, said control means being operative during factor diagnostic testing to generate sequences of signals for enabling the transfer of numbers of test address and data patterns to said inputs of said memory port address and input data sections when none of said memory module ORUs for more extensive testing of said address and data paths including said memory port sections and address and data buses.

11. The system of claim 1 wherein each memory request address includes a first group of address bits coded to specify a module address designating which of said memory modules is selected for access, second and third groups of address bits coded to specify row and column addresses respectively for accessing a location within said selected memory module, said apparatus address register means including a first address register coupled to said address bus to which said row and column addresses are applied, said address register being selectively conditioned to store said column address of said each memory request address for enabling said processing unit to verify the operability of said plurality of sections of each of said memory ports.

12. The system of claim 11 wherein said apparatus further includes a second address register coupled to said processing unit and to said control means, said second address register being conditioned by said control means to store said module address generated by said processing unit and transfer said module address to said processing unit for verification of said memory port address paths.

13. The system of claim 11 wherein at least one of said memory ports is a CPU memory port which directly couples to said processing unit, said plurality of sections of said CPU memory port further including a control section for storing a portion of said memory request coded to specify said type of memory operation to be performed, said control section being coupled to said output data section for conditioning said output data section during normal operation to store data read out to said data bus by said memory modules in response to a memory read request and said control section being coupled to said control means, said control means conditioning said control section to alter said normal operation by enabling said output data section to store data transferred to said data bus by said input data section in response to a memory write request processed during said testing.

14. The system of claim 13 wherein said control section includes a bistable load control element having a data input terminal and output terminal, input gating means coupled to said data input terminal and to said control section and said control means, and said output terminal being connected to said output data section, said input gating means being conditioned by said control means to switch said bistable load control element from a first state to a second state in the presence of a signal from said control section specifying a memory write operation, said element when in said second state conditioning said output data section to latch data applied by said input data section to said data bus in response to said memory write request.

15. The system of claim 11 wherein at least one of said memory ports is a CPU memory port which directly couples to said processing unit and another one of said memory ports is an I/O memory port which couples to a system bus which is coupled to a plurality of I/O controllers for receiving memory read and write requests therefrom, said system further including:
- a bus address section coupled to said processing unit, said apparatus control means and to said system bus for transferring addresses between said processing unit and said system bus I/O controllers; and,
- a bus data section coupled to said processing unit, said control means and to said system bus for transferring data between said processing unit and said system bus I/O controllers, said control means being operative to generate signals for conditioning said bus address and data sections for transferring memory write request address and data to said system bus for storage in said address and input data sections of said I/O memory port for verifying that said I/O memory port is functioning properly during testing.

16. The system of claim 15 wherein said plurality of sections of said I/O port further includes a control section for storing a portion of said memory request coded to specify said type of memory operation to be performed, said control section for conditioning said I/O port output data section during normal operation to store data read out to said data bus by said memory modules in response to an I/O memory read request and said I/O control section being coupled to said apparatus control means, said control means conditioning said I/O control section to alter said normal operation by enabling said I/O output data section to store data transferred to said data bus by said I/O input data section in response to an I/O memory write request processed during said testing and transferred to said system bus by said bus address and data sections.

17. The system of claim 16 wherein said apparatus further includes diagnostic data register means coupled to the output of said I/O memory port data output section, said control means and to said processing unit, said diagnostic data register being operative to store data to be transferred by said I/O memory port output data section to said system bus and said diagnostic data register being conditioned by said control means during said testing to transfer said data originating from said I/O input data section and stored in said I/O data output section to said processing unit for verification.

18. The system of claim 16 wherein said control means further includes channel number decoder circuit means coupled to said system bus and to said bus data section, said control means being operative during said testing to generate signals for conditioning said bus address and data sections for transferring to said system bus, memory read request address and channel number identification signals specifying said processing unit as the originator of said memory read for storage in said I/O port address section and said bus address section respectively, said control means conditioning said I/O control section from enabling data transferred to said data bus by said memory modules in response to said I/O memory read request to be loaded into said I/O output data section and said channel number decoder circuit means being operative in response to said I/O memory read request to condition said bus data section to store data transferred to said system bus by said I/O output data section previously stored in response to said I/O memory write request for transfer to said processing unit in response to signals generated by said control means during said test.

19. The system of claim 18 wherein said I/O control section includes a bistable load control element having a data input terminal and output terminal, input gating means coupled to said data input terminal and to said control section and said control means, and said output terminal being connected to said output data section, said input gating means being conditioned by a first control signal from said control means to switch said bistable load control element from a first state to a second state in the presence of a signal from said control section specifying a memory write operation, said element when in said second state conditioning said output data section to latch data applied by said input data section to said data bus in response to said memory write request and said input gating means being conditioned by a second control signal from said control means to inhibit said bistable load control element from switching from said first to said second state in the presence of said first control signal.

20. Diagnostic apparatus for testing and isolating faults to the optimum replaceable units CRUs of a main memory system of a data processing system, each one of a number of ORUs including a different one of a number of memory modules of said main memory system, another one of said ORUs including said diagnostic apparatus, a processing unit and at least one memory port coupled to said data processing unit for receiving memory requests, each request coded to specify the type of memory operation, an address specifying wherein memory data is being accessed from or written into, in addition to any data to be written therein, said one memory port including a plurality of sections including an address section, an input data section and output data section for storing said request address and data for transfer to memory and for storing data read out from said memory during a memory cycle of operation when said one memory port is granted access, the output of said address section being connected to a memory address bus which connects in common to each memory module ORU and the output of said input data section and the input of said output data section being connected in common to a memory data bus which connects in common to each memory module ORU, said diagnostic apparatus comprising:
- address register means coupled to said address bus and to said processing unit, said address register means being connected to said address bus and to said processing unit, said address register means being connected to receive and store each memory request address transferred to said address bus by said port address section during a memory read or write operation; and,
- control means coupled to said processing unit, to said address register means, to said input and output data sections, said control means being operative during an initial test procedure to condition said address register means to transfer stored addresses to said processing unit and for conditioning said output data section to store and transfer to said processing unit input memory data transferred to said memory data bus by said input data section for enabling said processing unit to isolate faults reliably within said memory system to said another ORU or one of said number of memory module ORUs.

21. The system of claim 20 wherein said control means includes:
an input register for storing microinstructions transferred by said processing unit and decode and register control circuit means coupled to said input register, said decode and register control circuit means being operative in response to said microinstructions to generate signals during said diagnostic testing required for enabling said processing unit to isolate said faults.

22. The system of claim 21 wherein said decode and register control circuit means includes addressable register means coupled to said input register and to different ones of said plurality of sections of said memory ports, said addressable register means including a plurality of bit locations which a preset to predetermined states in response to said microinstructions for conditioning said different ones of said plurality of sections during said testing to alter normal operation for enabling said processing unit to isolate said faults.

23. The system of claim 21 wherein said decode and register control circuit means couples to said processing unit, to said address register means, said address section, said input data section and to said output data section, said decode and register control circuit means being operative during said diagnostic testing to generate signals for enabling the transfer of a predetermined test address and data values to the inputs of said memory port address and input data sections for subsequent transfer to said memory module ORUs from said address and data buses by each of said memory ports upon being granted access to memory and storage in said address register means and said output data section, for enabling said processing unit to verify that said each memory port sections can process memory requests through the memory port address and data path including said address and data buses.

24. The system of claim 23 wherein said processing unit includes comparison means for comparing said predetermined test address and data values with the test address and data values transferred to said processing unit from said address register means and said corresponding one of said output data sections in response to signals generated by said decode and register control circuit means for verifying said address and data paths.

25. The system of claim 23 wherein said predetermined test values are the same, said decode and register control circuit means being operative during said diagnostic testing to generate a first sequence of signals for enabling said transfer of a first set of like test address and data values to said address and data buses and a second sequence of signals for enabling the transfer of a second set of like test address and data values to said address and data buses.

26. The system of claim 25 wherein said first and second sets of test address and data values applied to said address and data buses are coded to be complementary.

27. The system of claim 25 wherein each of said memory modules ORUs is included on a separate board removable from said memory system, said board further including a memory connector which connects to said address and data buses when said memory module ORU is installed in said memory system, said control means being operative during factory diagnostic testing to generate sequences of signals for enabling the transfer of a large number of test address and data patterns to said inputs of said memory port address and input data sections when none of said memory module ORUs for extensive testing of said one memory port sections and address and data buses.

28. The system of claim 20 wherein each memory request address includes a first group of address bits coded to specify a module address designating which of said memory modules is selected for access, second and third groups of address bits coded to specify row and column addresses respectively for accessing a location within said selected memory module, said diagnostic apparatus address register means including a first address register coupled to said address bus to which said row and column addresses are applied, said address register being selectively conditioned to store said column address of said each memory request address for enabling said processing unit to verify the operability of said sections of said one memory port.

29. The system of claim 28 wherein said diagnostic apparatus further includes a second address register coupled to said processing unit and to said control means, said second address register being conditioned by said control means to store said module address generated by said processing unit and transfer said module address to said processing unit for verification of said memory port address path.

30. The system of claim 20 wherein said one memory port is a CPU memory port which directly couples to said processing unit, said plurality of sections of said CPU memory port further including a control section for storing a portion of said memory request coded to specify said type of memory operation to be performed, said control section being coupled to said output data section for conditioning said output data section during normal operation to store data read out to said data bus by said memory modules in response to a memory read request and said control section being coupled to said control means, said control means conditioning said control section to alter said normal operation by enabling said output data section to store data transferred to said data bus by said input data section in response to a memory write request processed during said diagnostic testing.

31. The system of claim 20 wherein said one memory port is a CPU memory port which directly couples to said processing unit and said system further including:
an I/O memory port which couples to a system bus which is coupled to a plurality of I/O controllers for receiving memory read and write requests therefrom;
a bus address section coupled to said processing unit, said apparatus control means and to said system bus for transferring addresses between said processing unit and said system bus I/O controllers; and,
a bus data section coupled to said processing unit, said control means and to said system bus for transferring data between said processing unit and said system bus I/O controllers, said control means being operative to generate signals for conditioning said bus address and data sections for transferring memory write request address and data to said system bus for storage in said address and input data sections of said I/O memory port for verifying that said I/O memory port is functioning properly during said diagnostic testing.

32. The system of claim 31 wherein said I/O port further includes a control section for storing a portion of said memory request coded to specify said type of memory operation to be performed, said control section for conditioning said I/O port output data section during normal operation to store data read out to said data bus by said memory modules in response to an I/O memory read request and said I/O control section being coupled to said apparatus control means, said control means conditioning said I/O control section to alter said normal operation by enabling said I/O output data section to store data transferred to said data bus by said I/O input data section in response to an I/O memory write request processed during said diagnostic testing and transferred to said system bus by said bus address and data sections.

33. The system of claim 32 wherein said apparatus further includes diagnostic data register means coupled to the output of said I/O memory port data output section, said control means and to said processing unit, said diagnostic data register being operative to store data to be transferred by said I/O memory port output data section to said system bus and said diagnostic data register being conditioned by said control means during said diagnostic testing to transfer said data originating from said I/O input data section and stored in said I/O data output section to said processing unit for verification.

34. A data processing system including a single board computer having a central processing unit (CPU), a multiport main memory system including a number of memory ports which couple to a number of installable auxiliary memory module boards, each containing one of a number of memory modules and memory connectors for receiving address and data and transferring data, at least one of said memory ports being directly coupled to said CPU and at least another one of said memory ports being coupled to a plurality of I/O controllers connected in common to a system bus for receiving asynchronously generated memory read and write requests therefrom, said requests being coded to specify the type of memory operation, an address specifying where in said memory modules data is to be accessed from or written into, in addition to any data to be written therein during a memory cycle of operation, said memory system further including a priority resolver circuit coupled to each of said memory ports, to said CPU and to said system bus for receiving said requests and for generating signals indicating which of said ports has been granted access to said memory system and timing generating means coupled to said priority resolver circuit and operative to generate a sequence of timing signals for performing said memory cycle of operation, each of said memory ports including address, input data and output data sections for storing request address and data of a memory write request and data read out from said memory read requests, the outputs of each of said CPU and I/O port address sections being connected in common to one end of a memory address bus whose other end connect to each memory connector of each auxiliary memory module board and the output of each of said input data sections and the input of each of said output data sections being connected in common to one end of a memory data bus whose other end connects in common to said each memory connector of said each auxiliary memory module board, said single board further including diagnostic apparatus for enabling faults to be isolated to one of said boards during a memory wrap diagnostic test, said diagnostic apparatus comprising:

an address register coupled to said address bus, to said timing generating means and to said CPU, said address register being conditioned by predetermined signals from said timing generating means to store at least a predetermined portion of each address transferred by each port address section to said address bus during memory read and write cycles of operation; and, microinstruction decode and control means coupled to said CPU, to said address register, to said input data sections and to said output data sections, said control means being operative in response to microinstructions received from said CPU during said memory wrap test to condition said address register to transfer said predetermined address portions to said CPU and for selectively conditioning said output data sections for storing and transferring to said CPU, data signals representative of said input memory data being transferred to said memory data bus by corresponding ones of said memory port input data sections enabling said CPU to verify the operability of address and data buses, said address and data sections, portions of said timing generator means and said priority resolver circuit for isolating system faults to portions of said memory system and to said auxiliary memory module boards.

35. The system of claim 34 wherein said control means includes:

an input register for storing said microinstructions transferred by said processing unit and decode and register control circuit means coupled to said input register, said decode and register control circuit means being operative in response to said microinstructions to generate signals during said memory wrap diagnostic test required for enabling said processing unit to isolate said faults.

36. The system of claim 35 wherein said decode and register control circuit means couples to said processing unit, to said address register means, said address sections, said input data sections and to said output data sections, said decode and register control circuit means being operative during said memory wrap diagnostic test to generate signals for enabling the transfer of a predetermined test address and data values to the inputs of said memory port address and input data sections for subsequent transfer to said memory module ORUs from said address and data buses by each of said memory ports upon being granted access to memory and storage in said address register and a corresponding one of said output data sections for enabling said processing unit to verify that said each memory port sections can process memory requests through the memory port address and data paths.

37. The system of claim 36 wherein said predetermined test values are the same, said decode and register control circuit means being operative during said memory wrap diagnostic test to generate a first sequence of signals for enabling said transfer of a first set of like test address and data values to said address and data buses and a second sequence of signals for enabling the transfer of a second set of like test address and data values to said address and data buses.

38. The system of claim 37 wherein said first and second sets of test address and data values applied to said address and data buses are coded to be complementary.

39. The system of claim 34 wherein each memory port further including a control section for storing a portion of said memory request coded to specify said type of memory operation to be performed, said control section being coupled to said output data section for conditioning said output data section during normal operation to store data read out to said data bus by said memory module boards in response to a memory read request and said control section being coupled to said control means, said control means conditioning said control section to alter said normal operation by enabling said output data section to store data transferred to said data bus by said input data section in response to a memory write request processed during said memory wrap diagnostic test.

40. The system of claim 39 wherein each memory port control section includes a bistable load control element having a data input terminal and output terminal, input gating means coupled to said data input terminal and to said control section and said control means, and said output terminal being connected to said output data section, said input gating means being conditioned by said control means to switch said bistable load control element from a first state to a second state in the presence of a signal from said control section specifying a memory write operation, said element when in said second state conditioning said output data section to latch data applied by said input data section to said data bus in response to said memory write request.

41. The system of claim 34 wherein said system further includes:
   a bus address section coupled to said processing unit, said diagnostic apparatus control means and to said system bus for transferring addresses between said processing unit and said system bus I/O controllers; and,
   a bus data section coupled to said processing unit, said control means and to said system bus for transferring data between said processing unit and said system bus I/O controllers, said control means being operative to generate signals for conditioning said bus address and data sections for transferring memory write request input data sections of said I/O memory port for verifying that said I/O memory port is functioning properly during said memory wrap diagnostic test.

42. The system of claim 41 wherein said diagnostic apparatus further includes diagnostic data register means coupled to the output of said I/O memory port data output section, said control means and to said processing unit, said diagnostic data register being operative to store data to be transferred by said I/O memory port output data section to said system bus and said diagnostic data register being conditioned by said control means during said diagnostic testing to transfer said data originating from said I/O input data section and stored in said I/O data output section to said processing unit for verification.

43. The system of claim 41 wherein said control means further includes channel number decoder circuit means coupled to said system bus and to said bus data section, said control means being operative to generate signals for conditioning said bus and data sections for transferring to said system bus memory, read request address and channel number identification signals specifying said processing unit as the originator of said request for storing in I/O port address section and said bus address section, said control means conditioning said I/O control section to inhibit data transferred to said data bus by said memory modules in response to said I/O memory read request from being loaded into said I/O output data section and said channel number decoder circuit means being operative in response to said I/O memory read request to condition said bus data section to store said data transferred to said system bus by said I/O output data section previously stored in response to said I/O memory write request for transfer to said processing unit in response to signals generated by said control means during said memory wrap diagnostic test.

* * * * *